United States Patent
Dutta et al.

(10) Patent No.: US 12,306,830 B2
(45) Date of Patent: May 20, 2025

(54) SYSTEMS AND METHODS FOR QUERY ENRICHMENT AND GENERATION OF INTERFACES INCLUDING ENRICHED QUERY RESULTS

(71) Applicant: Walmart Apollo, LLC, Bentonville, AR (US)

(72) Inventors: Sumit Kumar Dutta, Karnataka (IN); Ritu Choudhary, Karnataka (IN); Sivaram Prasad Mudunuri, Karnataka (IN); Vikash Kumawat, Karnataka (IN); Basant Choudhary, West Bengal (IN); Kamiya Motwani, Karnataka (IN); Rahul Ghosh, Karnataka (IN); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/489,237

(22) Filed: Oct. 18, 2023

(65) Prior Publication Data
US 2025/0130994 A1    Apr. 24, 2025

(51) Int. Cl.
*G06F 16/24* (2019.01)
*G06F 16/2453* (2019.01)
(Continued)

(52) U.S. Cl.
CPC ........ *G06F 16/2453* (2019.01); *G06F 16/285* (2019.01); *G06Q 30/0629* (2013.01); *G06Q 30/0641* (2013.01)

(58) Field of Classification Search
CPC .............. G06F 16/2453; G06F 16/285; G06Q 30/0629; G06Q 30/0641
See application file for complete search history.

(56) References Cited

U.S. PATENT DOCUMENTS

| 9,443,209 B2 | 9/2016 | Parikh et al. |
| 11,393,010 B1 | 7/2022 | Chang et al. |
(Continued)

FOREIGN PATENT DOCUMENTS

WO    2022039749 A1    2/2022

OTHER PUBLICATIONS

Pacvue, "7 Best Practices for Successful Walmart Advertising," https://www.pacvue.com/blog/7-best-practices-for-successful-walmart-advertising, (Year: 2022), 8 pages.

*Primary Examiner* — Apu M Mofiz
*Assistant Examiner* — Cindy Nguyen
(74) *Attorney, Agent, or Firm* — Morgan, Lewis & Bockius LLP; Manita Rawat

(57) ABSTRACT

Systems and methods for generating enhanced user interfaces are disclosed. A set of candidate items responsive to a request for an enhanced interface is generated. The set of candidate items is responsive to a query or an anchor item. A composite candidate score for each candidate item is generated by a pick item scoring engine based on one or more historical interactions. A set of top-k items is selected from the set of candidate items and at least one pick item is selected from the set of top-k items. At least one enhancement interface element is selected for display in conjunction with the at least one pick item and a response to the request for the enhanced interface is transmitted that causes a receiving device to generate a user interface including the at least one pick item displayed in conjunction with the at least one enhancement interface element.

18 Claims, 22 Drawing Sheets

(51) Int. Cl.
    *G06F 16/28*         (2019.01)
    *G06Q 30/0601*     (2023.01)

(56)         References Cited

U.S. PATENT DOCUMENTS

| | | |
|---|---|---|
| 11,610,249 B2 | 3/2023 | Iyer et al. |
| 2008/0294501 A1 | 11/2008 | Rennich |
| 2014/0358906 A1* | 12/2014 | Behzadi ............. G06F 16/3344 |
| | | 707/723 |
| 2021/0241341 A1 | 8/2021 | Sharnagat et al. |
| 2021/0248662 A1 | 8/2021 | Agarwal et al. |
| 2022/0300999 A1* | 9/2022 | Ortiz ..................... H04L 63/10 |
| 2022/0382818 A1 | 12/2022 | Chen et al. |
| 2023/0401467 A1* | 12/2023 | Ferrucci ............. G06F 16/3329 |

\* cited by examiner

SYSTEMS AND METHODS FOR QUERY ENRICHMENT AND GENERATION OF INTERFACES INCLUDING ENRICHED QUERY RESULTS

TECHNICAL FIELD

This application relates generally to interface generation, and more particularly, to generation of interfaces including enriched query results.

BACKGROUND

Some current interface generation systems include interface elements that augment item pages by providing additional context. For example, an e-commerce website can include an interface element that provides additional context to an item, such as a "preferred choice" or "popular choice" indicator. Current systems generate these interface elements without consideration of the context of a search or platform when presenting the interface elements. For example, although some current systems provide certain augmentation elements on an item basis, such systems are unable to accurately provide augmentation elements related to search queries or different contexts.

In addition, some current systems that present interface elements that augment item pages provide limited interface elements that fail to identify or explain the context leading to selection of those interface elements. For example, although some current systems can present an interface element indicating a popular item returned within a set of search results, the reason for the identification of the popular item can be unrelated to the current context of the search query or unclear based on the presented interface element.

SUMMARY

In various embodiments, a system is disclosed. The system includes a non-transitory memory and a processor communicatively coupled to the non-transitory memory. The processor is configured to read a set of instructions to receive a request for an enhanced interface and generate a set of candidate items responsive to the request for the enhanced interface. The set of candidate items comprises a set of items responsive to a query when the request for the enhanced interface includes the query and an anchor item when the request for the enhanced interface includes the anchor item. The processor is further configured to generate a composite candidate score for each candidate item in the set of candidate items. The composite candidate score is generated by a pick item scoring engine based on one or more historical interactions associated with each candidate item in the set of candidate items received by the pick item scoring module. The processor is further configured to select a set of top-k items from the set of candidate items. The set of top-k items comprise k items from the set of candidate items having the highest candidate scores, and wherein k is a natural number. The processor is further configured to select at least one pick item from the set of top-k items, select at least one enhancement interface element for display in conjunction with the at least one pick item, and transmit a response to the request for the enhanced interface. The response is configured to cause a receiving device to generate a user interface including the at least one pick item displayed in conjunction with the at least one enhancement interface element.

In various embodiments, a computer-implemented method is disclosed. The computer-implemented method includes steps of receiving a request for an enhanced interface and generating a set of candidate items responsive to the request for the enhanced interface. The set of candidate items comprises a set of items responsive to a query when the request for the enhanced interface includes the query and an anchor item when the request for the enhanced interface includes the anchor item. The computer-implemented method further includes a step of generating a composite candidate score for each candidate item in the set of candidate items. The composite candidate score is generated by a pick item scoring engine based on one or more historical interactions associated with each candidate item in the set of candidate items received by the pick item scoring module. The computer-implemented method further includes a step of selecting a set of top-k items from the set of candidate items. The set of top-k items comprise k items from the set of candidate items having the highest candidate scores, and wherein k is a natural number. The computer-implemented method further includes the steps of selecting at least one pick item from the set of top-k items, selecting at least one enhancement interface element for display in conjunction with the at least one pick item, and transmitting a response to the request for the enhanced interface. The response is configured to cause a receiving device to generate a user interface including the at least one pick item displayed in conjunction with the at least one enhancement interface element.

In various embodiments, a non-transitory computer-readable medium having instructions stored thereon is disclosed. The instructions, when executed by at least one processor, cause a device to perform operations including receiving a request for an enhanced interface including a query, generating an augmented query, generating a set of candidate items responsive to the augmented query, and generating a composite candidate score for each candidate item in the set of candidate items. The composite candidate score is generated by a pick item scoring engine based on one or more historical interactions associated with each candidate item in the set of candidate items received by the pick item scoring module. The device further performs operations including selecting a set of top-k items from the set of candidate items. The set of top-k items comprise k items from the set of candidate items having the highest candidate scores, and wherein k is a natural number. The device further performs operations including selecting at least one pick item from the set of top-k items, selecting at least one enhancement interface element for display in conjunction with the at least one pick item, transmitting a response to the request for the enhanced interface. The response is configured to cause a receiving device to generate a user interface including the at least one pick item displayed in conjunction with the at least one enhancement interface element.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts, and wherein.

DETAILED DESCRIPTION

Figure 1:
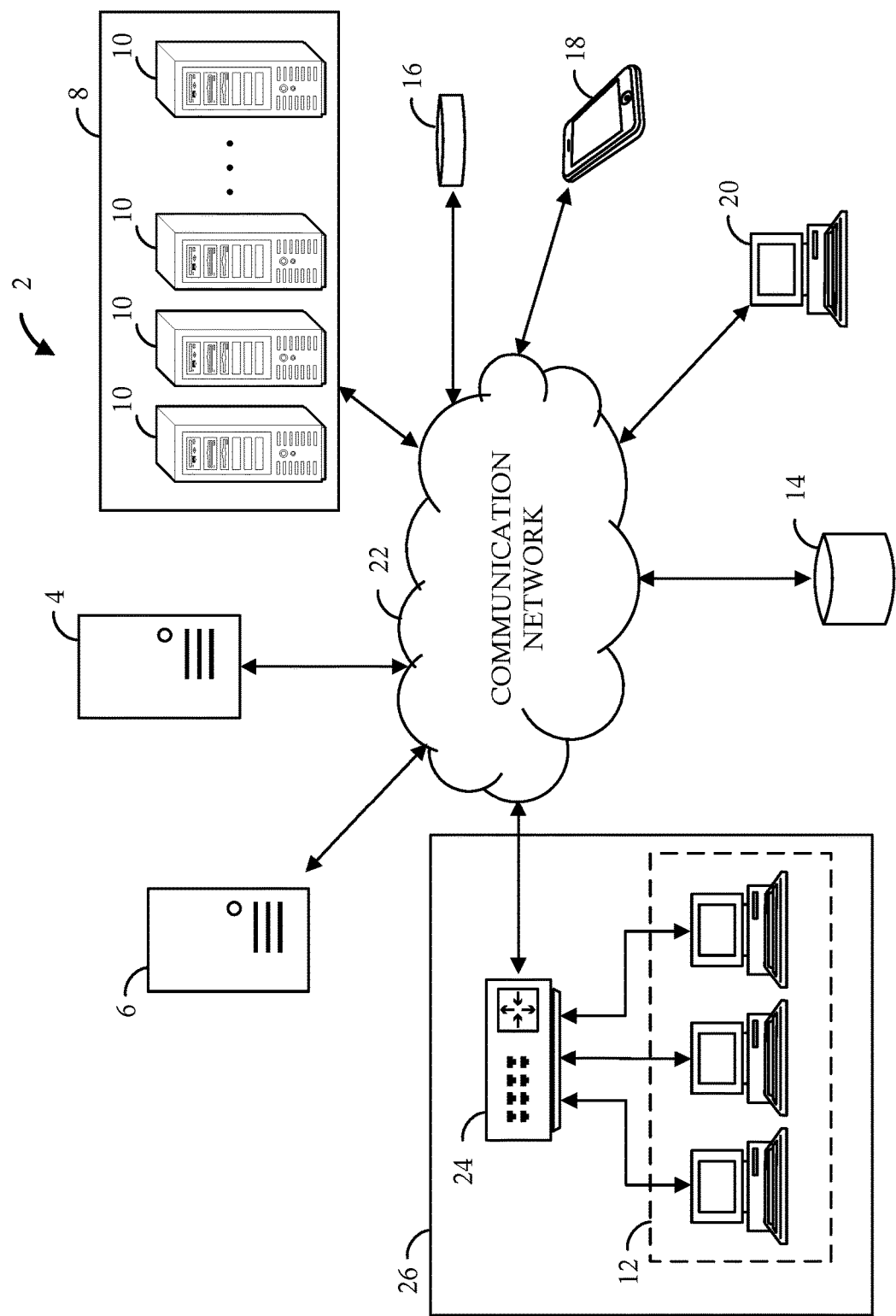
FIG. 1 illustrates a network environment configured to provide user interfaces including enriched query results, in accordance with some embodiments.

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for generating augmented queries. In some embodiments, a query received and provided to a query augmentation engine configured to generate an augmented query. In some embodiments, the augmentation engine is configured to augment one or more elements or features of a query by adding, removing, and/or substituting one or more terms in the query. For example, in the context of an e-commerce environment, the augmentation engine can be configured to augment a query to include one or more of a product type feature value, a brand feature value, a size feature value, a quantity feature value, and/or any other suitable augmentation. The augmentation engine may be configured to implement one or more trained models to generate an augmented query.

Additionally, various embodiments are described with respect to methods and systems for generating interfaces including enhanced interface elements. In some embodiments, a set of items, such as a set of search results generated in response to a search query, are provided to an enhancement engine. The enhancement engine is configured to identify one or more candidate items from the set of items for display in conjunction with an enhancement interface element. The enhancement engine may be configured to identify a candidate item to be associated with each of one or more enhancement interface elements and provide the candidate item and enhancement interface element to an interface generation engine for inclusion in a generated interface.

In some embodiments, systems and methods for generating an augmented search query and/or generating an interface including enhancement interface elements include one or more trained models. The trained models can include one or more models, such as, for example, a logistical regression model, a relevance model, a ranking model, a clustering model, a graph model, and/or any other suitable model. A trained model can include one or more trained models configured to generate an enriched search query and/or identify candidate items for display with augmentation interface elements, as discussed in greater detail herein.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network, or a convolutional deep neural network. Furthermore, a neural network can be an adversarial network, a deep adversarial network and/or a generative adversarial network.

In various embodiments, neural networks which are trained (e.g., configured or adapted) to generate an enriched search query, are disclosed. A neural network trained to generate an enriched search query may be referred to as a trained enrichment model. A trained enrichment model can be configured to receive a set of input data including a search query, augment the search query to include additional terms, context, and/or other features, and generate an enriched search query for use in additional processing tasks, such as, for example, generating search results, generating badge elements, and/or generating a user interface.

In various embodiments, neural networks which are trained (e.g., configured or adapted) to generate sets of candidate items for display in association with enhanced interface elements, are disclosed. A neural network trained to identify pick items may be referred to as a trained pick item identification model or trained pick item selection model. A trained pick item selection model can be configured to receive a set of input data including a set of items (such as search results generated using a query or augmented query), identify or select at least one candidate item for display with an enhanced interface element, and provide information for generating the enhanced interface element in conjunction with an interface element representative of the at least one candidate item to an interface generation engine.

FIG. 1 illustrates a network environment 2 configured to provide one or more user interfaces including enhancement interface elements, in accordance with some embodiments. The network environment 2 includes a plurality of devices or systems configured to communicate over one or more network channels, illustrated as a network cloud 22. For example, in various embodiments, the network environment 2 can include, but is not limited to, an enrichment computing device 4, a web server 6, a cloud-based engine 8 including one or more processing devices 10, workstation(s) 12, a database 14, and/or one or more user computing devices 16, 18, 20 operatively coupled over the network 22. The enrichment computing device 4, the web server 6, the workstation(s) 12, the processing device(s) 10, and the user computing devices 16, 18, 20 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 22.

In some embodiments, each of the enrichment computing device 4 and the processing device(s) 10 can be a computer, a workstation, a laptop, a server such as a cloud-based server, or any other suitable device. In some embodiments, each of the processing devices 10 is a server that includes one or more processing units, such as one or more graphical processing units (GPUs), one or more central processing units (CPUs), and/or one or more processing cores. Each processing device 10 may, in some embodiments, execute one or more virtual machines. In some embodiments, processing resources (e.g., capabilities) of the one or more processing devices 10 are offered as a cloud-based service (e.g., cloud computing). For example, the cloud-based engine 8 may offer computing and storage resources of the one or more processing devices 10 to the enrichment computing device 4.

In some embodiments, each of the user computing devices 16, 18, 20 can be a cellular phone, a smart phone, a tablet, a personal assistant device, a voice assistant device, a digital assistant, a laptop, a computer, or any other suitable device. In some embodiments, the web server 6 hosts one or more network environments, such as an e-commerce network environment. In some embodiments, the enrichment computing device 4, the processing devices 10, and/or the web server 6 are operated by the network environment provider, and the user computing devices 16, 18, 20 are operated by user of the network environment. In some embodiments, the processing devices 10 are operated by a third party (e.g., a cloud-computing provider).

The workstation(s) 12 are operably coupled to the communication network 22 via a router (or switch) 24. The workstation(s) 12 and/or the router 24 may be located at a physical location 26 remote from the enrichment computing device 4, for example. The workstation(s) 12 can communicate with the enrichment computing device 4 over the communication network 22. The workstation(s) 12 may send data to, and receive data from, the enrichment computing device 4. For example, the workstation(s) 12 may transmit data related to tracked operations performed at the physical location 26 to enrichment computing device 4.

Although FIG. 1 illustrates three user computing devices 16, 18, 20, the network environment 2 can include any number of user computing devices 16, 18, 20. Similarly, the network environment 2 can include any number of the enrichment computing device 4, the web server 6, the processing devices 10, the workstation(s) 12, and/or the databases 14. It will further be appreciated that additional systems, servers, storage mechanism, etc. can be included within the network environment 2. In addition, although embodiments are illustrated herein having individual, discrete systems, it will be appreciated that, in some embodiments, one or more systems can be combined into a single logical and/or physical system. For example, in various embodiments, one or more of the enrichment computing device 4, the web server 6, the workstation(s) 12, the database 14, the user computing devices 16, 18, 20, and/or the router 24 can be combined into a single logical and/or physical system. Similarly, although embodiments are illustrated having a single instance of each device or system, it will be appreciated that additional instances of a device can be implemented within the network environment 2. In some embodiments, two or more systems can be operated on shared hardware in which each system operates as a separate, discrete system utilizing the shared hardware, for example, according to one or more virtualization schemes.

The communication network 22 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 can provide access to, for example, the Internet.

Each of the first user computing device 16, the second user computing device 18, and the Nth user computing device 20 may communicate with the web server 6 over the communication network 22. For example, each of the user computing devices 16, 18, 20 may be operable to view, access, and interact with a website, such as an e-commerce website, hosted by the web server 6. The web server 6 may transmit user session data related to a user's activity (e.g., interactions) on the website. For example, a user may operate one of the user computing devices 16, 18, 20 to initiate a web browser that is directed to the website hosted by the web server 6. The user may, via the web browser, perform various operations such as searching one or more databases or catalogs associated with the displayed website, view item data for elements associated with and displayed on the website, and click on interface elements presented via the website, for example, in the search results. The website may capture these activities as user session data, and transmit the user session data to the enrichment computing device 4 over the communication network 22. The website may also allow the user to interact with one or more of interface elements to perform specific operations, such as selecting one or more items for further processing. In some embodiments, the web server 6 transmits user interaction data identifying interactions between the user and the website to the enrichment computing device 4.

In some embodiments, the enrichment computing device 4 may execute one or more models, processes, or algorithms, such as a machine learning model, deep learning model, statistical model, etc., to generate a set of recommended and/or related interface elements for inclusion in a requested interface based on an enriched user query. The enrichment computing device 4 may transmit an enriched query, one or more enrichment badges and associated items, and/or one or more search results for inclusion in a generated interface to the web server 6 over the communication network 22, and the web server 6 may display interface elements associated with the enriched query and/or the on the website to the user. For example, the web server 6 may display interface elements associated with the enriched query, enrichment badges, and/or the search results to the user on a homepage, a catalog webpage, an item webpage, a window or interface of a chatbot, a search results webpage, or a post-transaction webpage of the website (e.g., as the user browses those respective webpages).

In some embodiments, a user submits a query on a website hosted by the web server 6. The web server 6 may send a query enrichment request to the enrichment computing device 4. In response to receiving the query enrichment request, the enrichment computing device 4 may execute one or more processes to modify, or enrich, a received query to have a contextually appropriate form and/or include additional, contextually appropriate elements. For example, in some embodiments, a received search query can include non-standard (e.g., using short-form words or abbreviations, misspellings, non-standard word usage, etc.), noisy, and/or incomplete inputs that increase the difficulty of identifying query elements and, by extension, identifying appropriate augmentation elements or opportunities. A query enrichment system can be configured to modify a received search query, for example by standardizing, normalizing, sanitizing, and/or otherwise processing the query to generate an augmented query. The augmented query can include a standardized form and/or elements in a standardized form that is optimized for use in additional interface augmentation tasks, as described herein.

In some embodiments, the web server 6 transmits a search request to the enrichment computing device 4. In response to receiving the search request, the enrichment computing device 4 may execute one or more processes to generate an augmented user query, generate a set of responsive search results, and identify at least one item in the set of responsive search results to be displayed in conjunction with at least one enrichment interface element. The enrichment computing device 4 may be configured to implement one or more trained models to select a pick item for display with one or more enhancement interface elements given an anchor item, search query, and/or item features. For example, the enrichment computing device 4 can be configured to implement one or more trained models to select a set of responsive interface elements that are identified based on a provided anchor item and/or a provided query, where the responsive items are contextually appropriate and/or have a high likelihood of interaction given a user context when requesting an interface. The enrichment computing device 4 may be additionally and/or alternatively configured to select a set of responsive interface elements that are identified based on a provided anchor item and/or query, where the responsive items are contextually appropriate based on historical interactions between the anchor item and other items in a catalog associated with the interface. Although specific embodiments are discussed herein, it will be appreciated that enrichment computing device 4 can be configured to select any suitable set of elements and/or items for inclusion in a requested interface page.

In some embodiments, the enrichment computing device 4 is configured to generate a set of items for inclusion in a requested interface. For example, in some embodiments, the enrichment computing device 4 is configured to generate search results responsive to a received search query. The enrichment computing device 4 can be configured to implement one or more trained search models, such as one or more trained machine learning search models, to generate search results. The enrichment computing device 4 can utilize any suitable models for generating search results, such as, for example, natural language understanding models, ranking models, understanding models, feature generation models, embedding generation models, classification models, etc. In some embodiments, the enrichment computing device 4 is configured to receive the search query from, for example, the web server 6 and generate a set of search results. The set of search results can include one or more elements selected from a catalog of elements, such as, for example, one or more item selected from a catalog associated with an e-commerce website.

As another example, in some embodiments, the enrichment computing device 4 is configured to generate a set of recommended and/or related interface elements for inclusion in a requested interface. The enrichment computing device 4 may be configured to implement one or more trained models configured to select a set of additional elements (or items) given an anchor element (or item). For example, the enrichment computing device 4 can be configured to implement one or more trained models to select a set of recommended items that are identified based on a provided anchor item as being contextually appropriate and/or having a high likelihood of interaction given a user context when requesting an interface. The enrichment computing device 4 can be additional and/or alternatively configured to select a set of related items that are identified based on a provided anchor item as being contextually appropriate based on historical interactions between the anchor item and other items in a catalog associated with the interface. Although specific embodiments are discussed herein, it will be appreciated that the enrichment computing device 4 can be configured to select any suitable set of elements and/or items for inclusion in a requested interface page.

In some embodiments, the enrichment computing device 4 is configured to generate one or more interface elements configured to be displayed in conjunction with one or more of the elements in the search results to provide an augmented interface including one or more augmented search results. For example, in some embodiments, the enrichment computing device 4 is configured to generate badge elements configured to be displayed in conjunction with an element representative of an item selected from a catalog. Badge elements can include, but are not limited to, textual elements, image or pictorial elements, audible elements, etc. and can be configured to provide additional, contextually appropriate information to a user.

In some embodiments, the enrichment computing device 4 can be configured to generate augmentation elements, such as badging elements, based on a received query, an augmented query, and/or the set of search results. For example, the enrichment computing device 4 can be configured to implement one or more trained machine learning models configured to receive an augmented query and a set of search results and identify at least one element in the set of search results to be displayed in conjunction with at least one predetermined augmentation element. As another example, in some embodiments, the enrichment computing device 4 can be configured to additionally receive data representative of a context of a requested interface (e.g., data identifying a type of interface requested such as a home page, catalog page, browse page, category page, search results page, etc.), an augmented query, and a set of interface elements for display on the requested interface (e.g., a set of search results, a set of recommended items, a set of related items, etc.) and generate at least one element in the set of interface elements to be displayed in conjunction with at least one predetermined augmentation element.

In some embodiments, one or more of the user computing devices 16, 18, 20 are configured to receive and/or generate a user interface to allow a user to interact with services and/or resources provided by a network system, such as the enrichment computing device 4 and/or the web server 6. The user interface can include any suitable interface, such as, for example, a mobile device application interface, a network interface, and/or any other suitable interface. For example, in some embodiments, the web server 6 includes an interface generation engine configured to generate a customized network interface and provide the customized network interface, and/or instructions for generating the customized network interface, to a user computing device 16, 18, 20, which displays the user interface via one or more display elements. The customized network interface can include any suitable network interface, such as, for example, an e-commerce interface, a service interface, an intranet interface, and/or any other suitable user interface. In some embodiments, the customized interface includes a webpage, web portal, intranet page, application page, and/or other interactive interface. The customized network interface includes a set of amplified content elements selected, at least in part, by a content amplification engine.

In some embodiments, the enrichment computing device 4 is configured to generate a set of items for inclusion in a requested interface. For example, in some embodiments, the enrichment computing device 4 is configured to generate search results responsive to a received search query. The enrichment computing device 4 can be configured to implement one or more trained search models, such as one or more trained machine learning search models, to generate search results. the enrichment computing device 4 can utilize any suitable models for generating search results, such as, for example, natural language understanding models, ranking models, understanding models, feature generation models, embedding generation models, classification models, etc. In some embodiments, the enrichment computing device 4 is configured to receive the search query from the web server 6 and generate a set of search results. The set of search results can include one or more elements selected from a catalog of elements, such as, for example, one or more item selected from a catalog associated with an e-commerce website.

The enrichment computing device 4 is further operable to communicate with the database 14 over the communication network 22. For example, the enrichment computing device 4 can store data to, and read data from, the database 14. The database 14 can be a remote storage device, such as a cloud-based server, a disk (e.g., a hard disk), a memory device on another application server, a networked computer, or any other suitable remote storage. Although shown remote to the enrichment computing device 4, in some embodiments, the database 14 can be a local storage device, such as a hard drive, a non-volatile memory, or a USB stick. The enrichment computing device 4 may store interaction data received from the web server 6 in the database 14. The enrichment computing device 4 may also receive from the web server 6 user session data identifying events associated with browsing sessions, and may store the user session data in the database 14.

In some embodiments, the enrichment computing device 4 generates training data for a plurality of models (e.g., machine learning models, deep learning models, statistical models, algorithms, etc.) based on aggregation data, historical search data, holiday and event data, historical user session data, current search data, purchase data, catalog data, advertisement data for the users, etc. The enrichment computing device 4 and/or one or more of the processing devices 10 may train one or more models based on corresponding training data. The enrichment computing device 4 can store the models in a database, such as in the database 14 (e.g., a cloud storage database).

The models, when executed by the enrichment computing device 4, allow the enrichment computing device 4 to generate enriched search queries and/or generate enrichment interface elements for inclusion in generated user interfaces. For example, the enrichment computing device 4 may obtain one or more models from the database 14. The enrichment computing device 4 may then receive, in real-time from the web server 6, a search query. In response to receiving the search query, the enrichment computing device 4 may execute one or more models to generate an enriched search query, as described herein. The enrichment computing device 4 may further execute one or more models to generate search results based on the enriched search query and/or to generate enrichment interface elements for inclusion in a generated interface.

In some embodiments, the enrichment computing device 4 assigns the models (or parts thereof) for execution to one or more processing devices 10. For example, each model may be assigned to a virtual machine hosted by a processing device 10. The virtual machine may cause the models or parts thereof to execute on one or more processing units such as GPUs. In some embodiments, the virtual machines assign each model (or part thereof) among a plurality of processing units. Based on the output of the models, enrichment computing device 4 may generate enriched user queries, search result sets, and/or enrichment interface elements.

Figure 2:
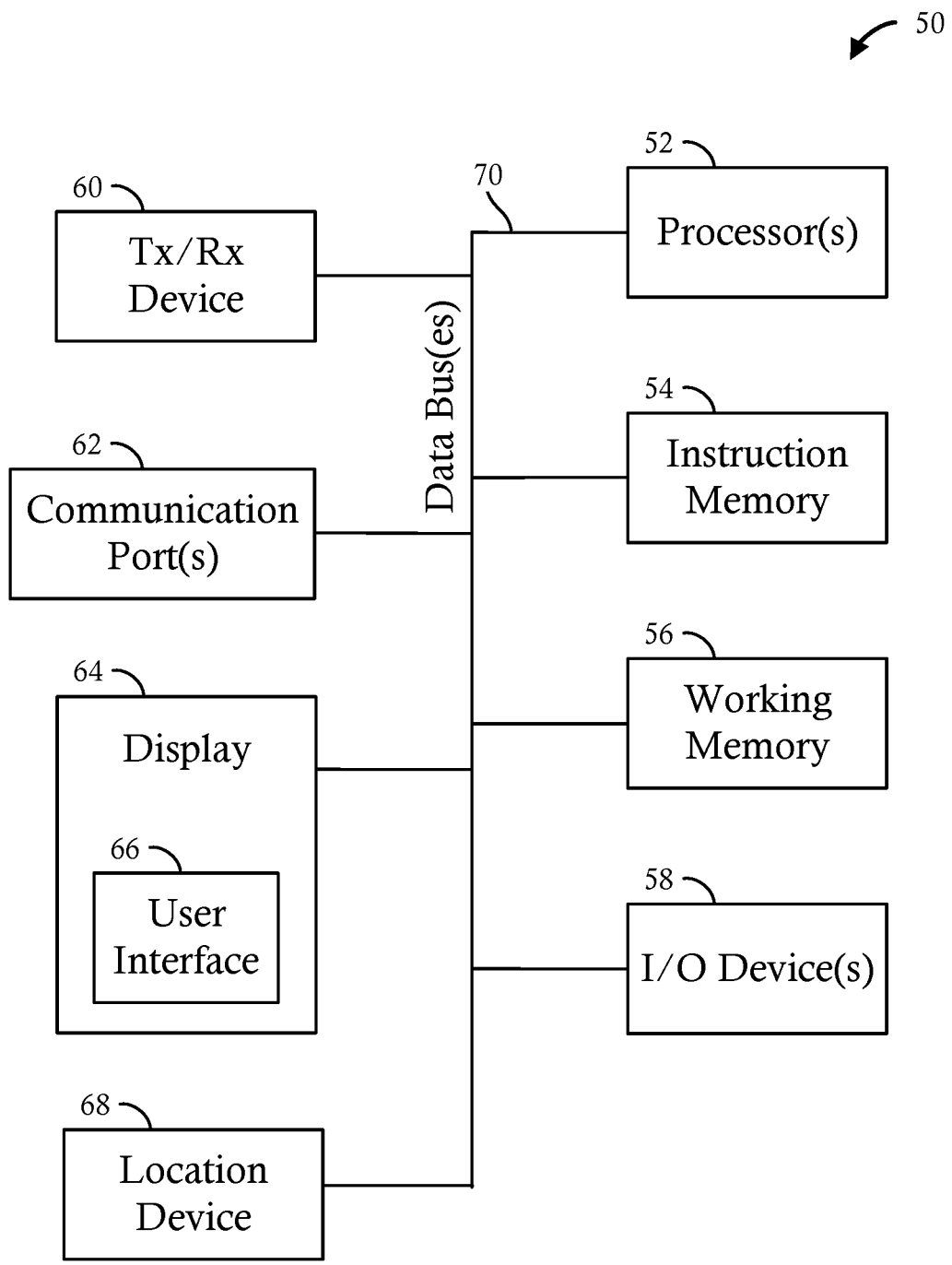
FIG. 2 illustrates a computer system configured to implement one or more processes, in accordance with some embodiments.

FIG. 2 illustrates a block diagram of a computing device 50, in accordance with some embodiments. In some embodiments, each of the enrichment computing device 4, the web server 6, the one or more processing devices 10, the workstation(s) 12, and/or the user computing devices 16, 18, 20 in FIG. 1 may include the features shown in FIG. 2. Although FIG. 2 is described with respect to certain components shown therein, it will be appreciated that the elements of the computing device 50 can be combined, omitted, and/or replicated. In addition, it will be appreciated that additional elements other than those illustrated in FIG. 2 can be added to the computing device.

As shown in FIG. 2, the computing device 50 can include one or more processors 52, an instruction memory 54, a working memory 56, one or more input/output devices 58, a transceiver 60, one or more communication ports 62, a display 64 with a user interface 66, and an optional location device 68, all operatively coupled to one or more data buses 70. The data buses 70 allow for communication among the various components. The data buses 70 can include wired, or wireless, communication channels.

The one or more processors 52 can include any processing circuitry operable to control operations of the computing device 50. In some embodiments, the one or more processors 52 include one or more distinct processors, each having one or more cores (e.g., processing circuits). Each of the distinct processors can have the same or different structure. The one or more processors 52 can include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 52 may also be implemented by a controller, a microcontroller, an application specific integrated circuit (ASIC), a field programmable gate array (FPGA), a programmable logic device (PLD), etc.

In some embodiments, the one or more processors 52 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 54 can store instructions that can be accessed (e.g., read) and executed by at least one of the one or more processors 52. For example, the instruction memory 54 can be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 52 can be configured to perform a certain function or operation by executing code, stored on the instruction memory 54, embodying the function or operation. For example, the one or more processors 52 can be configured to execute code stored in the instruction memory 54 to perform one or more of any function, method, or operation disclosed herein.

Additionally, the one or more processors 52 can store data to, and read data from, the working memory 56. For example, the one or more processors 52 can store a working set of instructions to the working memory 56, such as instructions loaded from the instruction memory 54. The one or more processors 52 can also use the working memory 56 to store dynamic data created during one or more operations. The working memory 56 can include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 54 and working memory 56, it will be appreciated that the computing device 50 can include a single memory unit configured to operate as both instruction memory and working memory. Further, although embodiments are discussed herein including non-volatile memory, it will be appreciated that computing device 50 can include volatile memory components in addition to at least one non-volatile memory component.

In some embodiments, the instruction memory 54 and/or the working memory 56 includes an instruction set, in the form of a file for executing various methods, such as methods for generating enriched queries and/or generating interfaces including enrichment interface elements, as described herein. The instruction set can be stored in any acceptable form of machine-readable instructions, including source code or various appropriate programming languages. Some examples of programming languages that can be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 52.

The input-output devices 58 can include any suitable device that allows for data input or output. For example, the input-output devices 58 can include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 60 and/or the communication port(s) 62 allow for communication with a network, such as the communication network 22 of FIG. 1. For example, if the communication network 22 of FIG. 1 is a cellular network, the transceiver 60 is configured to allow communications with the cellular network. In some embodiments, the transceiver 60 is selected based on the type of the communication network 22 the computing device 50 will be operating in. The one or more processors 52 are operable to receive data from, or send data to, a network, such as the communication network 22 of FIG. 1, via the transceiver 60.

The communication port(s) 62 may include any suitable hardware, software, and/or combination of hardware and software that is capable of coupling the computing device 50 to one or more networks and/or additional devices. The communication port(s) 62 can be arranged to operate with any suitable technique for controlling information signals using a desired set of communications protocols, services, or operating procedures. The communication port(s) 62 can include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 62 allows for the programming of executable instructions in the instruction memory 54. In some embodiments, the communication port(s) 62 allow for the transfer (e.g., uploading or downloading) of data, such as machine learning model training data.

In some embodiments, the communication port(s) 62 are configured to couple the computing device 50 to a network. The network can include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments can include in-body communications, various devices, and various modes of communications such as wireless communications, wired communications, and combinations of the same.

In some embodiments, the transceiver 60 and/or the communication port(s) 62 are configured to utilize one or more communication protocols. Examples of wired protocols can include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols can include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 64 can be any suitable display, and may display the user interface 66. The user interfaces 66 can enable user interaction with the enrichment interface elements and/or associated interface elements corresponding to one or more items identified in the search result set. For example, the user interface 66 can be a user interface for an application of a network environment operator that allows a user to view and interact with the operator's website. In some embodiments, a user can interact with the user interface 66 by engaging the input-output devices 58. In some embodiments, the display 64 can be a touchscreen, where the user interface 66 is displayed on the touchscreen.

The display 64 can include a screen such as, for example, a Liquid Crystal Display (LCD) screen, a light-emitting diode (LED) screen, an organic LED (OLED) screen, a movable display, a projection, etc. In some embodiments, the display 64 can include a coder/decoder, also known as Codecs, to convert digital media data into analog signals. For example, the visual peripheral output device can include video Codecs, audio Codecs, or any other suitable type of Codec.

The optional location device 68 may be communicatively coupled to the a location network and operable to receive position data from the location network. For example, in some embodiments, the location device 68 includes a GPS device configured to receive position data identifying a latitude and longitude from one or more satellites of a GPS constellation. As another example, in some embodiments, the location device 68 is a cellular device configured to receive location data from one or more localized cellular towers. Based on the position data, the computing device 50 may determine a local geographical area (e.g., town, city, state, etc.) of its position.

In some embodiments, the computing device 50 is configured to implement one or more modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
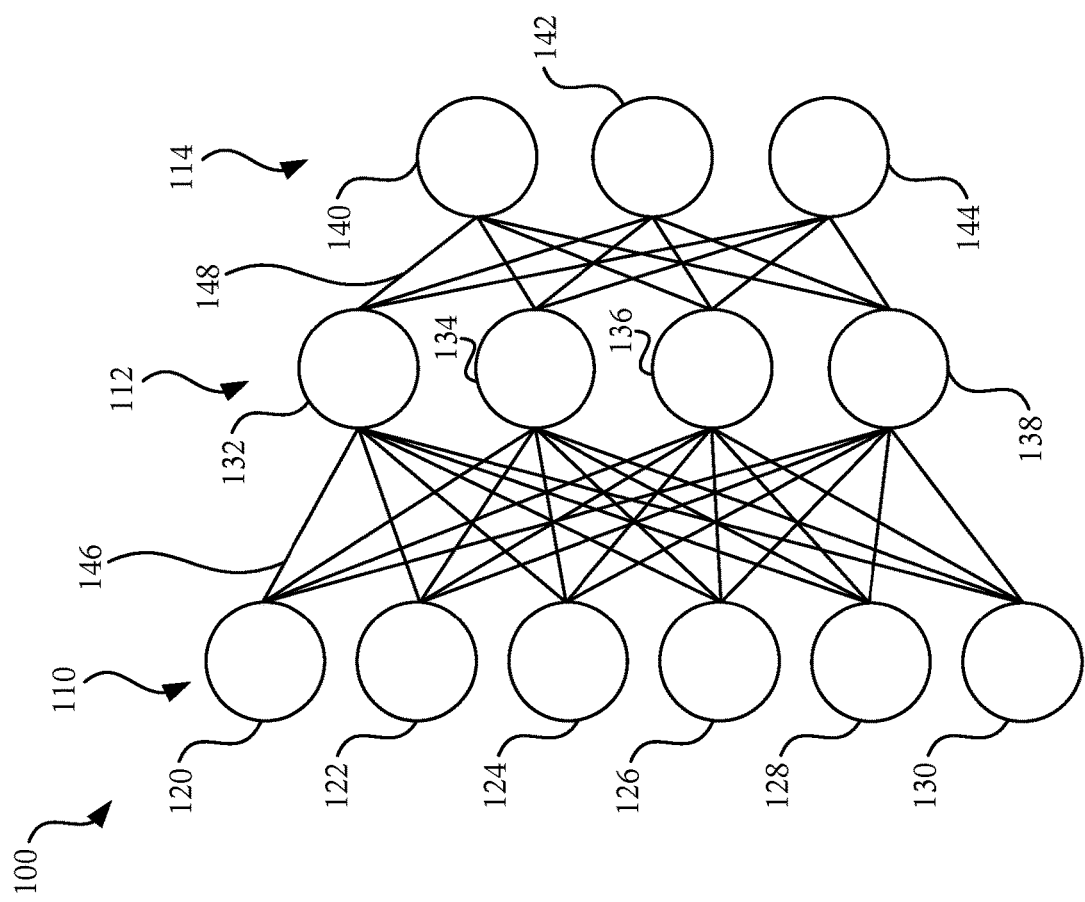
FIG. 3 illustrates an artificial neural network, in accordance with some embodiments.

FIG. 3 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 3 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 can be arranged in layers 110-114, wherein the layers can comprise an intrinsic order introduced by the edges 146-148 between the nodes 120-144. In particular, edges 146-148 can exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 can be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number can be assigned as a value to every node 120-144 of the neural network 100. Here, $x_i^{(n)}$ denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 can comprise a weight being a real number, in particular, the weight is a real number within the interval [−1, 1], within the interval [0, 1], and/or within any other suitable interval. Here, $w_{i,j}^{(m,n)}$ denotes the weight of the edge between the i-th node 120-138 of the m-th layer 110, 112 and the j-th node 132-144 of the n-th layer 112, 114. Furthermore, the abbreviation $w_{i,j}^{(n)}$ is defined for the weight $w_{i,j}^{(n,n+1)}$.

In particular, to calculate the output values of the neural network 100, the input values are propagated through the neural network. In particular, the values of the nodes 132-144 of the (n+1)-th layer 112, 114 can be calculated based on the values of the nodes 120-138 of the n-th layer 110, 112 by $$x_j^{(n+1)} = f(\Sigma_i x_i^{(n)} \cdot w_{i,j}^{(n)})$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 can be calculated based on the values of the input layer 110 of the neural network and/or based on the values of a prior hidden layer, etc.

In order to set the values $w_{i,j}^{(m,n)}$ for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w'_{i,j}^{(n)} = w_{i,j}^{(n)} - \gamma \cdot \delta_j^{(n)} \cdot x_i^{(n)}$$

wherein $\gamma$ is a learning rate, and the numbers $\delta_j^{(n)}$ can be recursively calculated as $$\delta_j^{(n)} = (\Sigma_k \delta_k^{(n+1)} \cdot w_{j,k}^{(n+1)}) \cdot f'(\Sigma_i x_i^{(n)} \cdot w_{i,j}^{(n)})$$

based on $\delta_j^{(n+1)}$, if the (n+1)-th layer is not the output layer, and $$\delta_j^{(n)} = (x_k^{(n+1)} - t_j^{(n+1)}) \cdot f'(\Sigma_i x_i^{(n)} \cdot w_{i,j}^{(n)})$$

if the (n+1)-th layer is the output layer 114, wherein f' is the first derivative of the activation function, and $y_j^{(n+1)}$ is the comparison training value for the j-th node of the output layer 114.

In some embodiments, the neural network 100 is configured, or trained, to provide augmentation interface elements, such as badge elements, for display in conjunction with one or more selected interface elements from a set of interface elements. The neural network 100 can be configured to receive a query input, such as an augmented query, and a set of interface elements (i.e., data identifying a query input and a set of interface elements) and generate an output identifying at least one augmentation interface element and at least one associated interface element selected from the set of interface elements.

Figure 4:
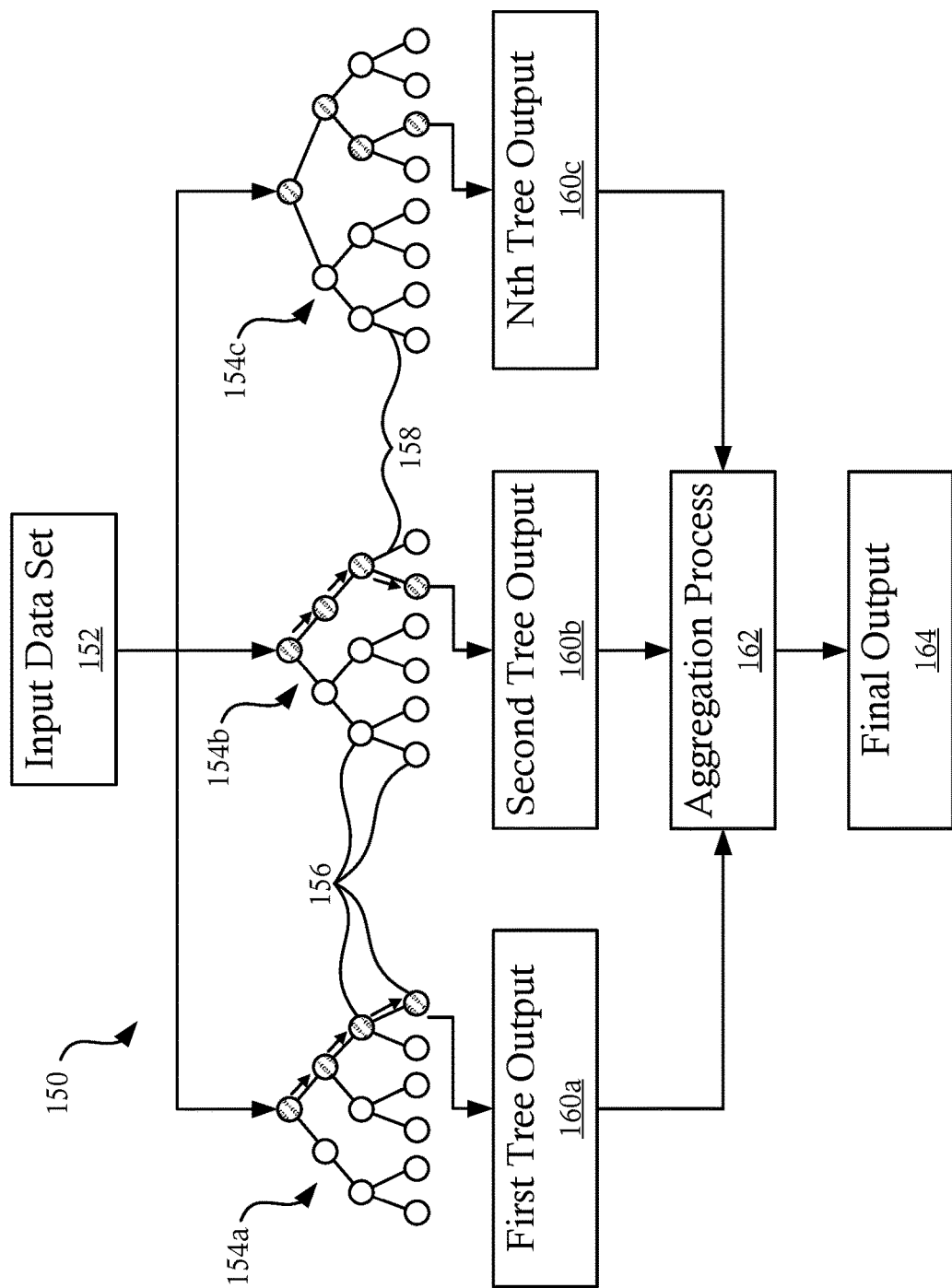
FIG. 4 illustrates a tree-based artificial neural network, in accordance with some embodiments.

FIG. 4 illustrates a tree-based neural network 150, in accordance with some embodiments. In particular, the tree-based neural network 150 is a random forest neural network, though it will be appreciated that the discussion herein is applicable to other decision tree neural networks. The tree-based neural network 150 includes a plurality of trained decision trees 154a-154c each including a set of nodes 156 (also referred to as "leaves") and a set of edges 158 (also referred to as "branches").

Each of the trained decision trees 154a-154c can include a classification and/or a regression tree (CART). Classification trees include a tree model in which a target variable can take a discrete set of values, e.g., can be classified as one of a set of values. In classification trees, each leaf 156 represents class labels and each of the branches 158 represents conjunctions of features that connect the class labels. Regression trees include a tree model in which the target variable can take continuous values (e.g., a real number value).

In operation, an input data set 152 including one or more features or attributes is received. A subset of the input data set 152 is provided to each of the trained decision trees 154a-154c. The subset can include a portion of and/or all of the features or attributes included in the input data set 152. Each of the trained decision trees 154a-154c is trained to receive the subset of the input data set 152 and generate a tree output value 160*a*-160*c*, such as a classification or regression output. The individual tree output value 160*a*-160*c* is determined by traversing the trained decision trees 154*a*-154*c* to arrive at a final leaf (or node) 156.

In some embodiments, the tree-based neural network 150 applies an aggregation process 162 to combine the output of each of the trained decision trees 154*a*-154*c* into a final output 164. For example, in embodiments including classification trees, the tree-based neural network 150 can apply a majority-voting process to identify a classification selected by the majority of the trained decision trees 154*a*-154*c*. As another example, in embodiments including regression trees, the tree-based neural network 150 can apply an average, mean, and/or other mathematical process to generate a composite output of the trained decision trees. The final output 164 is provided as an output of the tree-based neural network 150.

In some embodiments, the tree-based neural network 150 is configured, or trained, to provide augmentation interface elements, such as badge elements, for display in conjunction with one or more selected interface elements from a set of interface elements. The tree-based neural network 150 can be configured to receive a query input, such as an augmented query, and a set of interface elements (i.e., data identifying a query input and a set of interface elements) and generate an output identifying at least one augmentation interface element and at least one associated interface element selected from the set of interface elements.

Figure 5:
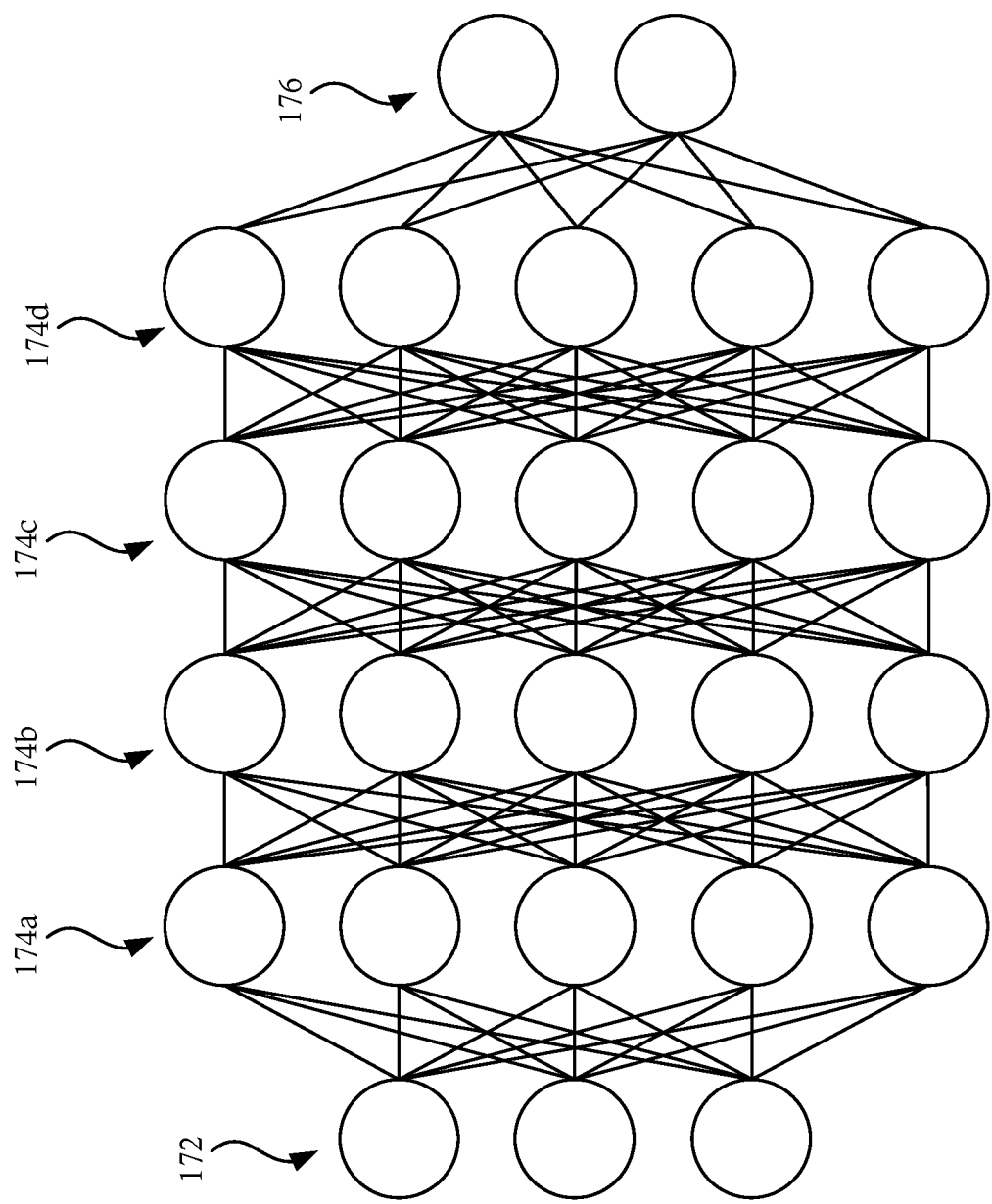
FIG. 5 illustrates a deep neural network (DNN), in accordance with some embodiments.

FIG. 5 illustrates a deep neural network (DNN) 170, in accordance with some embodiments. The DNN 170 is an artificial neural network, such as the neural network 100 illustrated in conjunction with FIG. 3, that includes representation learning. The DNN 170 can include an unbounded number of (e.g., two or more) intermediate layers 174*a*-174*d* each of a bounded size (e.g., having a predetermined number of nodes), providing for practical application and optimized implementation of a universal classifier. Each of the layers 174*a*-174*d* can be heterogenous. The DNN 170 can is configured to model complex, non-linear relationships. Intermediate layers, such as intermediate layer 174*c*, can provide compositions of features from lower layers, such as layers 174*a*, 174*b*, providing for modeling of complex data.

In some embodiments, the DNN 170 can be considered a stacked neural network including multiple layers each configured to execute one or more computations. The computation for a network with L hidden layers can be denoted as:

$$f(x) = f\left[a^{(L+1)}\left(h^{(L)}\left(a^{(L)}\left(\ldots\left(h^{(2)}\left(a^{(2)}\left(h^{(1)}\left(a^{(1)}(x)\right)\right)\right)\right)\right)\right)\right)\right]$$

where $a^{(l)}(x)$ is a preactivation function and $h^{(l)}(x)$ is a hidden-layer activation function providing the output of each hidden layer. The pre-activation function $a^{(l)}(x)$ can include a linear operation with matrix $W^{(l)}$ and bias $b^{(l)}$ where:

$$a^{(l)}(x) = W^{(l)}x + b^{(l)}$$

In some embodiments, the DNN 170 is a feedforward network in which data flows from an input layer 172 to an output layer 176 without looping back through any layers. In some embodiments, the DNN 170 can include a backpropagation network in which the output of at least one hidden layer is provided, e.g., propagated, to a prior hidden layer. The DNN 170 can include any suitable neural network, such as a self-organizing neural network, a recurrent neural network, a convolutional neural network, a modular neural network, and/or any other suitable neural network.

In some embodiments, a DNN 170 can include a neural additive model (NAM). An NAM includes a linear combination of networks, each of which attends to (e.g., provides a calculation regarding) a single input feature. For example, an NAM can be represented as:

$$y = \beta + f_1(x_1) + f_2(x_2) + \ldots + f_k(x_K)$$

where $\beta$ is an offset and each $f_i$ is parametrized by a neural network. In some embodiments, the DNN 170 can include a neural multiplicative model (NMM), including a multiplicative form for the NAM mode using a log transformation of the dependent variable y and the independent variable x:

$$y = e^{\beta} e^{f(\log x)} e^{\Sigma_i f_i^d(di)}$$

where d represents one or more features of the independent variable x.

Figure 6:
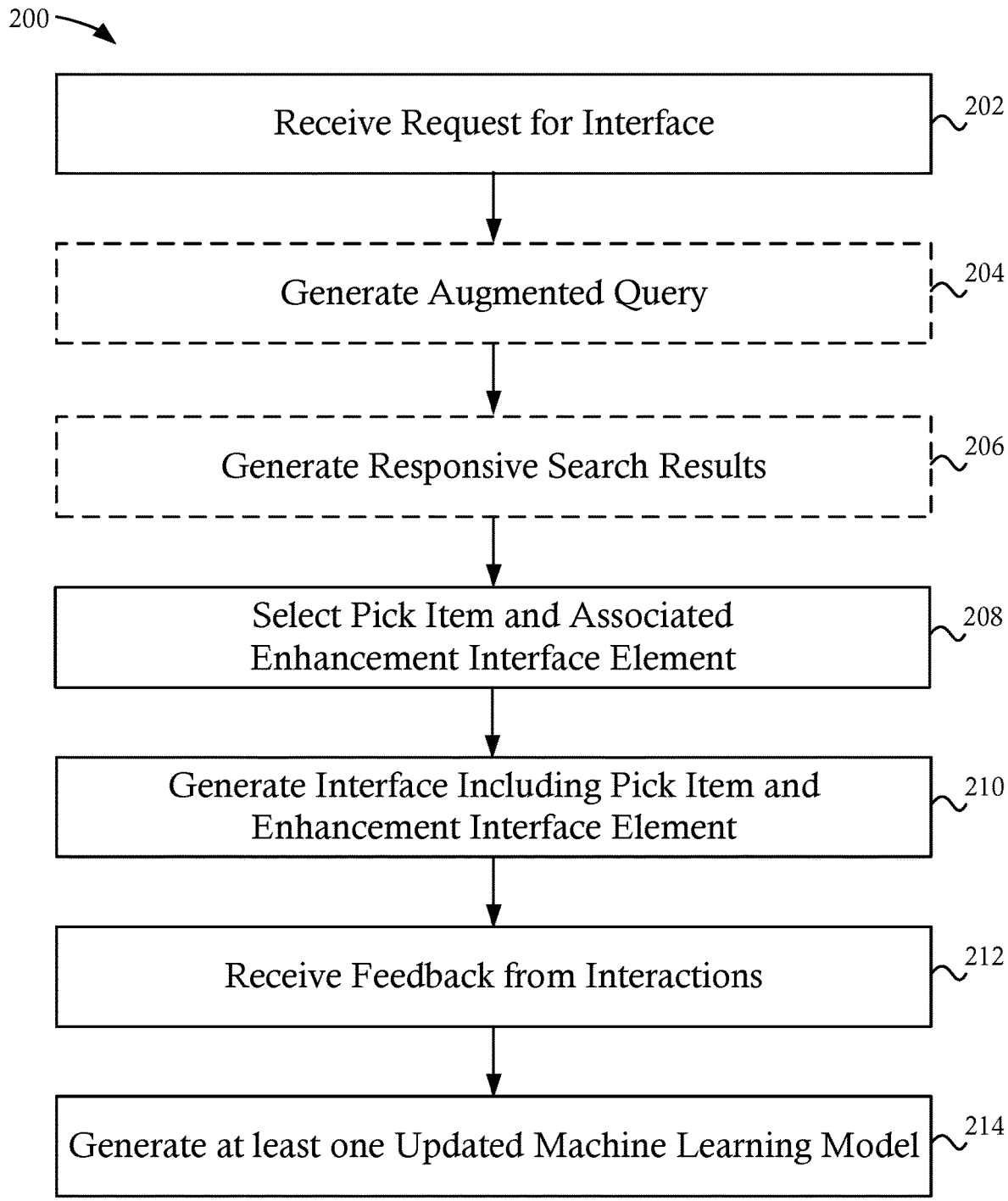
FIG. 6 is a flowchart illustrating an interface generation method for generating an enhanced user interface including at least one enhancement interface element, in accordance with some embodiments.
Figure 7:
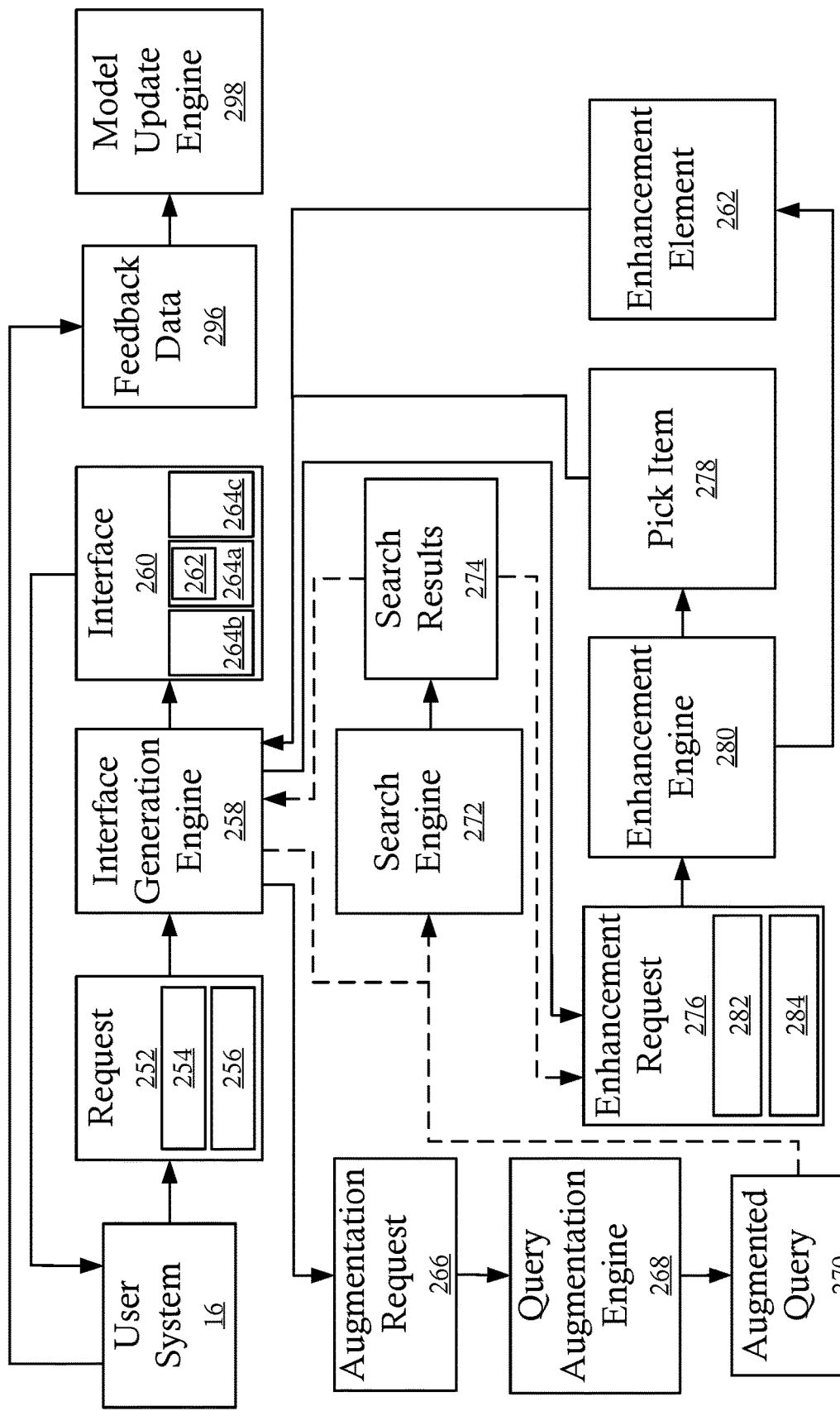
FIG. 7 is a process flow illustrating various steps of the interface generation method of FIG. 6, in accordance with some embodiments.

FIG. 6 is a flowchart illustrating an interface generation method 200 for generating an interface including interface badge elements selected using an enriched query, in accordance with some embodiments. FIG. 7 is a process flow 250 illustrating various steps of the interface generation method 200 of generating an interface including interface badge elements selected using an enriched query, in accordance with some embodiments. At step 202, an interface request 252 is received. An interface request 252 may include a request for a network interface, such as a newly generated network interface page, a modified network interface page, etc. The interface request 252 may include an initial interface request and/or a subsequent interface request. The interface request 252 may be received by any suitable system and/or engine, such as, for example, an interface generation engine 258. The interface request 252 can be generated by any suitable system, such as, for example, a user computing device 16, 18, 20, a web server 6, etc.

In some embodiments, the interface request 252 can include a query 254 and/or session data 256 representative of one or more contextual elements of the interface request 252. For example, in some embodiments, the query 254 can be generated by interactions with one or more interface pages and/or interface page elements associated with a network interface. For example, in some embodiments, a query 254 can include an alphanumeric input, such as a search string, an item identifier, etc. provided to a search bar or other search component presented within an interface page, such as a search page, home page, etc. of a network interface. An alphanumeric search string can include one or more alphanumeric entries (e.g., words, phrases, numbers, etc.) indicating a scope or target of a search. Similarly, an item identifier can identify one or more anchor items to be used as a basis of a search for similar and/or related items. As another example, in some embodiments, a query 254 can be provided through one or more interactions with interface elements of an interface, such as, for example, selecting an item element that is programmatically generated to request an interface page including search results related to the item element. In the context of an e-commerce network interface, a search query can include, but is not limited to, one or more descriptors for items of interest as provided by a user device.

In some embodiments, session data 256 includes user signals representative of one or more features of a user when the interface request 252 was generated. User features can include, but are not limited to, user intent features, user journey features, user system features, session data, etc. In some embodiments, user signals can be generated using any suitable mechanism, such as, for example, a cookie, beacon, and/or other data element generated by and/or stored on a user computing device 16, 18, 20. In some embodiments, user signals can be generated by a server or other network interface device, such as a web server 6, based on interactions between a user device and a network interface. The user signals can include, but are not limited to, one or more intent signals representative of a user intent, session journey, etc., one or more historical feature signals representative of prior interactions between users (e.g., the same user and/or different users) with the network interface and/or information provided by the user regarding user preferences, and/or any other suitable signals.

In some embodiments, the interface request 252 includes an identifier for a type of interface requested. For example, in various embodiments, the interface request 252 can include a request for a home page, a catalog page, a search page, a browse page, etc. The type of page requested can be dependent on the context of the network environment (e.g., an e-commerce environment may have a first set of page types while an e-service environment may have a second set of page types), the user context, and/or any other suitable inputs. In some embodiments, the interface generation engine 258 is configured to determine a page type for generating a responsive interface based on additional data included in the interface request 252, such as, for example, the session data 256.

In some embodiments, the interface generation engine 258 is configured to generate an enhanced interface 260 responsive to the interface request 252 including one or more enhancement interface elements 262. For example, in some embodiments, when the interface request 252 includes a query 254, the interface generation engine 258 may be configured to generate an enhanced interface 260 including a search results page incorporating interface elements 264a-264c representative of items in a catalog responsive to the query 254 and at least one enhancement interface element 262 associated with at least one of the item interface elements 264a representative of items in a catalog. As another example, in some embodiments, when an interface request 252 includes an item identifier or anchor item, the interface generation engine 258 is configured to generate a catalog page including information related to a selected item obtained from an associated catalog, one or more additional visual elements representative of selected items such as complimentary items, recommended items, related items, etc., and at least one augmentation interface element. It will be appreciated that the interface generation engine 258 can be configured to generate any suitable interface including any suitable responsive elements and at least one element compatible with and/or configured to be augmented by one or more augmentation interface elements.

In some embodiments, the interface generation engine 258 is configured to implement one or more modules, processes, and/or steps to generate the enhanced interface 260. For example, the interface generation engine 258 may be configured to implement one or more trained models, process flows, and/or algorithms configured to perform one or more steps to generate an interface. In some embodiments, the interface generation engine 258 may be configured to obtain an interface template from a database, populate the template with one or more enhancement interface elements 262, 264a-264c responsive to the interface request 252, modify the template responsive to the interface request 252, and/or otherwise generate an enhanced interface 260. In some embodiments, the interface generation engine 258 is configured to obtain interface elements and/or data configured to generate interface elements from one or more additional systems, engines, and/or modules, as discussed herein.

At optional step 204, an augmented query 270 is generated. For example, in some embodiments, the interface generation engine 258 may generate an augmentation request 266 requesting generation of an augmented query 270. An augmented query 270 may include a query, such as a textual query, that has been augmented to add, remove, or modify one or more terms in the query. The augmented query 270 may be generated by any suitable system, engine, module, etc., such as a query augmentation engine 268. In some embodiments, the interface generation engine 258 is configured to receive an interface request 252 for an interface and generate an augmentation request 266 including at least a portion of the data included in the interface requests 252, such as the query 254 and/or a portion of the session data 256. The augmentation request 266 may be transmitted from the interface generation engine 258 to the query augmentation engine 268, which is configured to generate the augmented query 270 in response to the received augmentation request 266.

In some embodiments, the query augmentation engine 268 is configured to augment, or enrich, a query 254 to generate the augmented query 270. Augmentation of a query 254 may include adding missing context to the query, for example, by adding or completing missing elements, features, descriptors, etc. Augmentation may additionally include standardizing, normalizing, sanitizing, and/or otherwise processing a query 254 to generate an augmented query 270 having a predetermined form. In some embodiments, the query augmentation engine 268 generates an augmented query 270 in accordance with an implemented query enrichment method, such as the query enrichment method 300 illustrated in FIG. 8.

Figure 8:
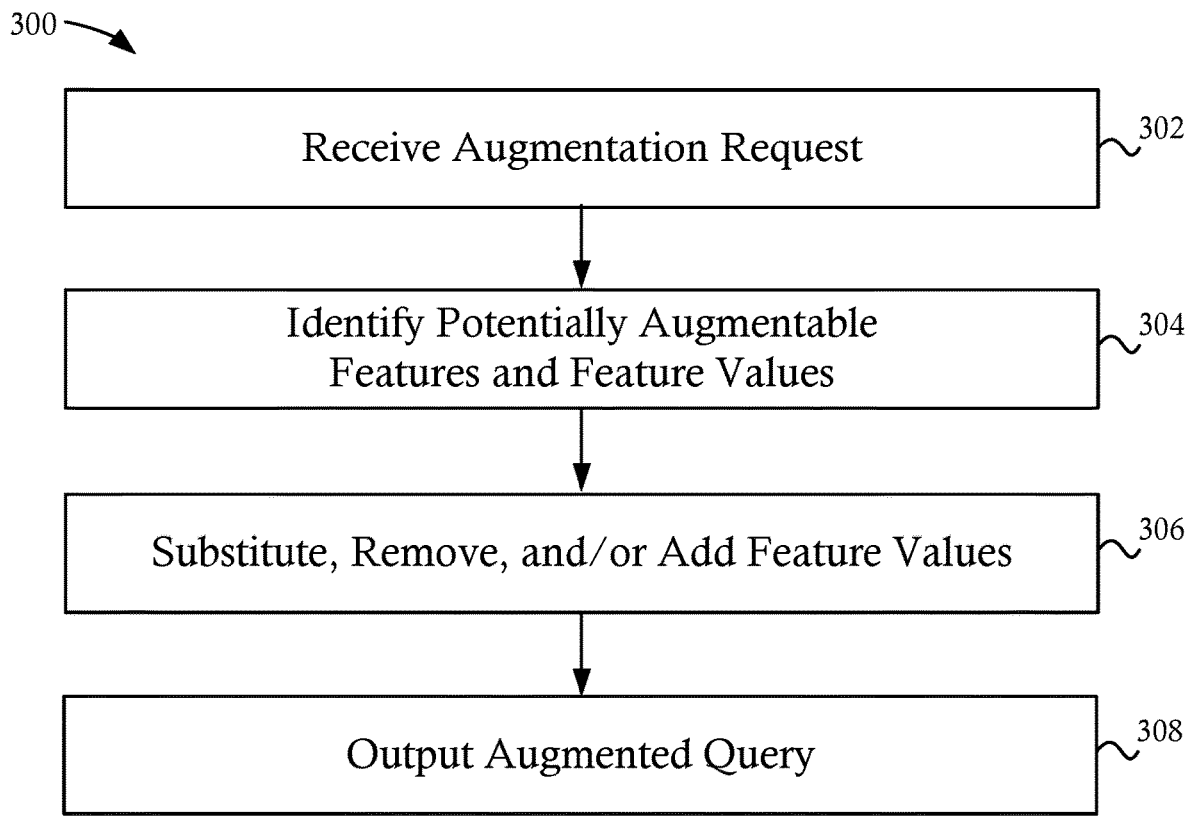
FIG. 8 is a flowchart illustrating a query enrichment method, in accordance with some embodiments.
Figure 9:
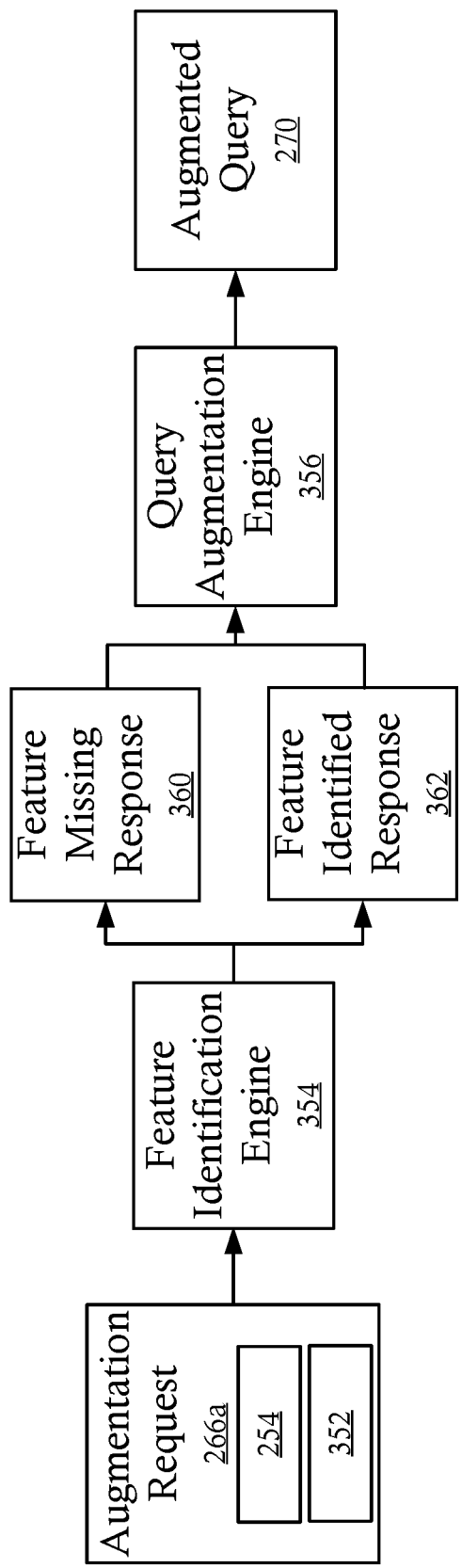
FIG. 9 is a process flow illustrating various steps of the query enrichment method of FIG. 8, in accordance with some embodiments.

FIG. 8 is a flowchart illustrating a query enrichment method 300, in accordance with some embodiments. FIG. 9 is a process flow 350 illustrating various steps of the query enrichment method 300, in accordance with some embodiments. At step 302, an augmentation request 266a is received. The augmentation request 266a can include data representative of one or more elements or items to be augmented, such as, for example, a query 254. The augmentation request 266a can include additional augmentation contextual data 352 that is utilized by the query augmentation engine 268. For example, in various embodiments, the augmentation contextual data 352 can include, but is not limited to, a set of potential augmentation features or values, e.g., a set of product types, brand names, sizes, quantities, colors, finishes, etc. that can be added to a query to generate an augmented search query. As another example, in some embodiments, the augmentation contextual data 352 can include a portion of the session data 256 received in conjunction with the initial interface request 252.

At step 304, at least augmentable value is identified in the query 254. The augmentable value may be identified by any suitable system, device, module, engine, etc., such as, for example, a feature identification engine 354. For example, in some embodiments, a query 254 related to a catalog of items associated with a network interface may include or omit one or more specific values for one or more features associated with items within the catalog. In the context of an e-commerce environment, a query 254 may include values for one or more features associated with an item in an e-commerce catalog, such as a brand feature, a product type feature, a color feature, a size feature, a quantity feature, etc. It will be appreciated that any suitable set of features can be defined by a catalog and/or potentially included in a query 254 depending on the context of the network environment. The feature identification engine 354 may be configured to identify the presence and/or absence of a feature value for each potential feature that may be included in the query 254.

In some embodiments, the feature identification engine 354 is configured to determine the presence or absence of features within a query 254 based on the terms or values in the query 254. For example, terms or values in the query 254 may be compared with a set of known feature values for the associated catalog. If a match is identified between a term or terms in the query and a feature value, the feature identification engine 354 may generate a feature identified response 362. If a match is not identified, the feature identification engine 354 may generate a feature missing response 360. In the context of an e-commerce environment, terms or values in the query 254 may be compared to a set of known brands, product types, etc. associated with each of the items in the e-commerce catalog. For example, a query 254 and a set of brand feature values for an e-commerce catalog may include the term "BrandY," indicating the presence of a brand feature in the query 254 having a value of "BrandY." As another example, a query 254 may include a term such as "ink bottles" and a set of product type feature values may include a term "Printer Refills" that is identified as match to "ink bottles" indicating the presence of a product type feature in the query 254 having the value "ink bottles." It will be appreciated that the comparison of terms or values can be performed as a textual comparison (e.g., based on direct matching of textual characters or terms in the query 254), a token comparison (e.g., a comparison of one or more embeddings generated for n-grams selected from the query 254 as discussed in greater detail below), and/or any other suitable comparison.

Figure 10:
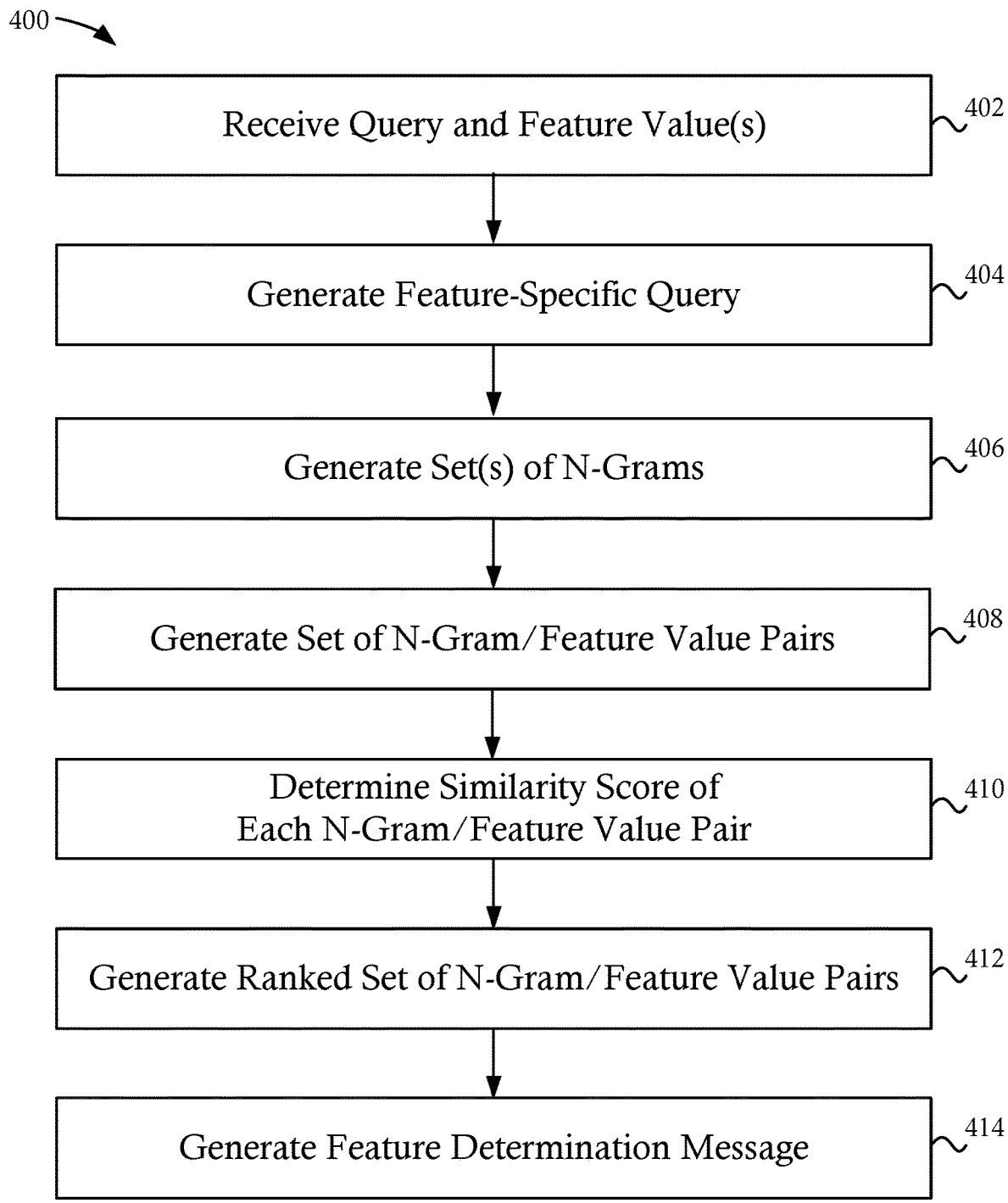
FIG. 10 is a flowchart illustrating a feature determination method, in accordance with some embodiments.
Figure 11:
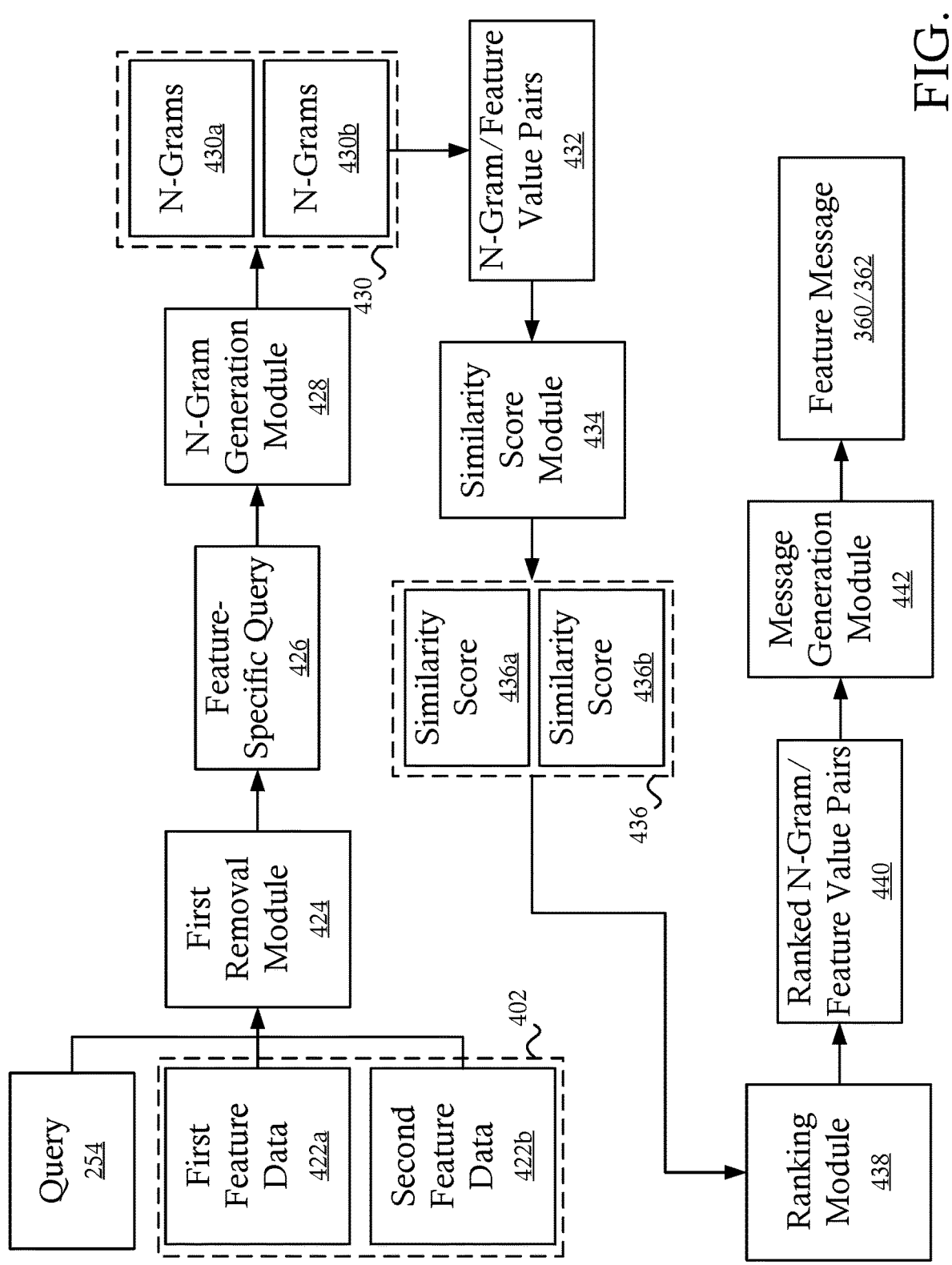
FIG. 11 is a process flow illustrating various steps of the feature determination method of FIG. 10, in accordance with some embodiments.

In some embodiments, the feature identification engine 354 is configured to implement a feature determination process, such as the feature determination method 400 illustrated in FIG. 10. FIG. 11 is a process flow 420 illustrating various steps of the feature determination method 400, in accordance with some embodiments. At step 402, a query 254 and data identifying one or more potential feature values 422a-422b (collectively "feature values 422") is received. In some embodiments, the feature values 422 include potential values for one or more features associated with elements (e.g., items) in a network catalog, such as items in an e-commerce catalog. In some embodiments, the feature values 422 include pre-generated token embeddings representative of underlying feature values having a first form, such as textual feature values, image-based feature values, etc.

At step 404, a feature-specific query 426 is generated. The feature-specific query 426 may be generated by selecting a target feature (e.g., a first feature) from the set of features associated with the network catalog and removing feature values for non-selected features from the query 254, e.g., if a query 254 includes a first feature value associated with a first feature and a second feature value associated with a second feature, a feature-specific query 426 for the first feature may be generated by removing the feature value of the second feature from the query 254. As one non-limiting example, a query 254 in the context of an e-commerce environment may include a textual string defining two features, a brand and a product type, e.g., a query for "BrandX ParameterA ProductTypeZ". To generate a feature-specific query 426 for the "product type" feature, the feature value for the "brand" feature (e.g., the non-selected feature) is removed from the query 254, resulting in a product-type specific query of "ParameterA ProductTypeZ." Although specific embodiments are discussed herein, it will be appreciated that feature-specific queries 426 may be generated for any applicable feature associated with items and/or interface elements maintained by a network catalog.

In some embodiments, a feature removal module 424 is configured to generate a feature-specific query 426. The feature removal module 424 may include any suitable process to identify and remove feature values. For example, in various embodiments, the feature removal module 424 may be configured to implement one or more rules-based recognition and/or removal process (e.g., direct textual matches between elements having feature values for non-selected features), trained natural language processing models, and/or any other suitable process. In some embodiments, processes as described herein to identify feature values in a query 254 may also be applied to identify non-selected feature values for removal.

At step 406, one or more sets of n-grams 430a, 430b (collectively "n-grams 430") are generated based on the feature-specific query 426. An n-gram includes a contiguous sequence of n elements (e.g., characters, words, etc.) selected from an input, such as a feature-specific query 426. The n-grams 430 may include n-grams having one or more types, such as, for example, one or more unigrams (e.g., a gram having a single word or term), one or more bigrams (e.g., a gram having two contiguous words or terms), one or more trigrams, one or more nth grams, etc. As one non-limiting example, a feature-specific query 426 may include a string having three words or terms, e.g., "ParameterA ProductTypeZ ParameterB." A set of unigrams generated from the feature-specific query 426 may include each of the individual terms, e.g., ["ParameterA", "ProductTypeZ", "ParameterB"], and a set of bigrams may include each set of two contiguous terms, e.g., ["ParameterA ProductTypeZ", "ProductTypeZ ParameterB"]. It will be appreciated that any suitable set of n-grams may be generated from the feature-specific query 426.

In some embodiments, the n-grams 430 may be generated by an n-gram generation module 428. The n-gram generation module 428 may be configured to identify individual n-grams within a feature-specific query 426 utilizing any suitable processes and/or methods. For example, in some embodiments, the n-gram generation module 428 identifies separation characters (e.g., spaces, returns, colons, commas, etc.) used to separate terms in a query, such as a feature-specific query 426 and identifies elements between separation characters as individual n-grams. As another example, in some embodiments, the n-gram generation module 428 is configured to apply one or more trained natural language processing modules, such as a semantic module, configured to identify n-grams within strings of input. Although specific embodiments are discussed herein, it will be appreciated that any suitable process for recognizing n-grams may be implemented by the n-gram generation module 428.

At step 408, a set of n-gram/feature value pairs 432 are generated and, at step 410, a similarity score 436a, 436b (collectively "similarity scores 436") is determined for each n-gram/feature value pair in the set of n-gram/feature value pairs 432. In some embodiments, each n-gram/feature value pairs is generated by combining one of the n-grams 430 and one of the potential feature values 422a for a first selected feature. An n-gram/feature value pair may be generated for each n-gram 430 in combination with each feature value 422a, e.g., the number of n-gram/feature value pairs in the set of n-gram/feature value pairs 432 is equal to the number of n-grams 430 multiplied by the number of potential values in the feature values 422a.

The similarity scores 436 may include any suitable similarity score, such as, for example, cosine similarity scores. In some embodiments, the similarity score 436 for each n-gram/feature value pair is determined based on a cosine similarity of one or more embeddings (e.g., one or more token embeddings) generated based on the associated n-gram 430 and one or more embeddings generated from the associated feature values 422a, e.g.:

cosine_sim(Token("Feature Value"),Token("gram"))

Each of the generated embeddings may include a representation of one or more individual elements, e.g., words, characters, etc., in an associated n-gram, such as a vector representations of the selected elements generated according to one or more frameworks.

The embeddings may be generated using any suitable embedding generation process, such as, for example, one or more trained embedding generation models implemented by and/or included in a similarity score determination module 434. A trained embedding generation model may include any suitable embedding generation framework, such as a Word2Vec framework (e.g., continuous bag-of-words model, continuous skip-gram model, etc.) trained (e.g., generated) utilizing one or more training datasets. It will be appreciated that multiple trained embedding generation models can be generated using similar/identical frameworks trained utilizing different datasets, similar/identical frameworks trained utilizing similar/identical datasets, different frameworks trained using similar/identical frameworks, and/or different frameworks trained using different datasets.

Figure 12:
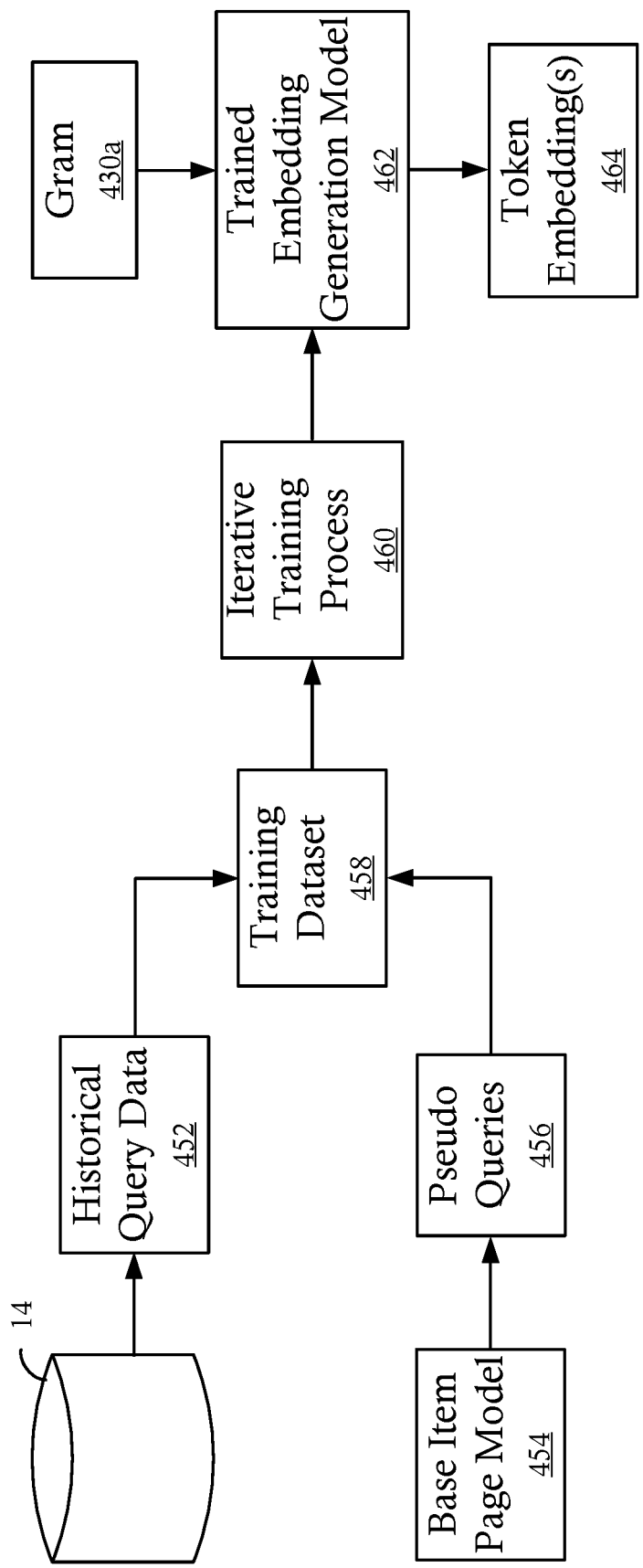
FIG. 12 is a process flow illustrating generation and operation of a trained embedding generation model, in accordance with some embodiments.

FIG. 12 is a process flow 450 illustrating generation and operation of a trained embedding generation model 462, in accordance with some embodiments. As discussed in greater detail below, trained machine learning models may be generated utilizing an iterative training process based on a set of training data. In some embodiments, a system or device, such as the enrichment computing device 4, one or more processing device(s) 10, and/or a workstation 12, is configured to generate a training dataset 458 for use in training one or more embedding generation models 462.

In some embodiments, the training dataset 458 includes historical query data 452. The historical query data 452 can be obtained from historical transaction data stored by one or more databases, such as database 14. The historical query data 452 includes historical (e.g., past) queries and associated features. Features associated with historical queries can include, but are not limited to, session data associated with a historical query (e.g., items or interface elements selected in response to a query, items purchased in response to a query, etc.), corrected search results generated by an automated and/or manual process, ranked search results for each historical search query, etc. In some embodiments, the historical query data 452 includes a set of the top N queries for a selected time period and/or associated with one or more items, where N is a natural number. For example, in some embodiments, the historical query data 452 can include a set of the N most frequent search queries (N>0) in the last week, month, season, etc. It will be appreciated that the historical query data 452 can include any suitable number of queries for any defined time period.

In some embodiments, the training dataset 458 includes one or more pseudo queries 456. Pseudo queries 456 may include synthetic (e.g., artificial) queries and/or partial queries generated by a trained machine learning model, such as a base item page model 454. A base item page model 454 may be generated using any suitable framework, such as, for example, a language model framework iteratively trained to generate textual query outputs. The language model framework may be configured utilizing historical search queries and/or other historical data to generate synthetic queries. In some embodiments, the base item page model 454 is configured to receive an input set (e.g., a set of items, a set of session context data, etc.) and generate an output including a pseudo queries 456 for each element in the input set. Each of the pseudo queries 456 may be generated according to a template. For example, in some embodiments, a pseudo query of type <feature 1, feature 2> can be generated for each item in a set of items. The features (e.g., feature 1, feature 2) can include any suitable features associated with items in a catalog associated with a network interface. In the context of an e-commerce interface, the features can include features associated with and/or defined for items in an e-commerce catalog such as brand, product type, etc. As one non-limiting example, a set of pseudo queries generated for an e-commerce interface can include a pseudo query of type <brand, product type> for each item in a set of items (e.g., each item in an e-commerce catalog).

In some embodiments, an iterative training process 460 is applied to generate a trained embedding generation model 462. Iterative training processes, such as iterative training process 460, are discussed in greater detail below with respect to FIGS. 21-22. In some embodiments, an iterative training process 460 may be executed to train a selected model framework to iteratively adjust parameters (e.g., hyperparameters) of the selected model framework to minimize a cost value (e.g., an output of a cost function) for the selected model framework. For example, the iterative training process 460 may be configured to apply the training dataset 458 to a word2vec framework to generate a trained embedding generation model 462 including a trained word2vec model. Although specific embodiments are discussed herein, it will be appreciated that any suitable embedding generation framework may be utilized.

In some embodiments, a trained embedding generation model 462 is implemented to generate token embeddings for each element or term in a corresponding n-gram, such as n-gram 430a. For example, the trained embedding generation model 462 may be implemented as part of and/or by a feature identification engine 354 which generates a set of feature-specific n-grams 430. The trained embedding generation model 462 receives each of the n-grams 430 and generates a set of token embeddings 466 based on the trained model framework. For example, a set of token embeddings 466 can include token embeddings corresponding to each word in a corresponding n-gram 430a (e.g., one embedding for unigrams, two embeddings for bigrams, etc.), each character in a corresponding n-gram 430a, etc. In some embodiments, the set of token embeddings 466 generated for a corresponding n-gram 430a includes a unified embedding generated by combining (e.g., concatenation, XOR, etc.) two or more embeddings generated for individual elements (e.g., words, characters, etc.) of a corresponding n-gram 430a.

With reference again to FIGS. 10-11, at step 412, a set of ranked n-gram/feature value pairs 440 is generated by filtering and/or ranking the set of n-gram/feature value pairs 432 by an associated similarity score 436. For example, in some embodiments, a ranking module 438 is configured to receive each n-gram/feature value pair in the set of n-gram/feature value pairs 432 and an associated similarity score 436 output of the similarity score determination module 434.

In some embodiments, n-gram/feature value pairs having an associated similarity score 436 below a first predetermined threshold are removed from (e.g., not added to) the ranked set of n-gram/feature value pairs 440. For example, a similarity score 436 below a first predetermined threshold may indicate that an n-gram is not associated with or related to the corresponding feature value in the n-gram/feature value pair. In some embodiments, the ranked set of n-gram/feature value pairs 440 may be ranked from highest similarity score to lowest similarity score utilizing any suitable sorting and/or ranking algorithm, process, and/or model.

At step 414, a feature determination message is generated. For example, in some embodiments, if each similarity score 436 associated with an n-gram/feature value pair in the ranked set of n-gram/feature value pairs 440 is below a second predetermined threshold, the a feature message generation module 442 may determine that a feature value for the selected feature is not present in the query 254 (e.g., the selected feature is not present in the query 254) and generate a feature missing response 360. The feature missing response 360 may include the feature value associated with a highest ranked n-gram/feature value pair, e.g., a feature value for the n-gram/feature value pair having the highest similarity score in the ranked set of n-gram/feature value pairs 440. Alternatively, the feature missing response 360 may include an empty or null value. If at least one similarity score 436 as associated with an n-gram/feature value pair in the ranked set of n-gram/feature value pairs 440 is equal to or greater than the second predetermined threshold, a feature message generation module 442 may determine that a feature value for the selected feature is present and returns a feature identified response 362. The feature identified response 362 may include the n-gram and/or the feature value associated with a highest ranked n-gram/feature value pair, e.g., a feature value and/or n-gram for the n-gram/feature value pair having the highest similarity score 436 in the ranked set of n-gram/feature value pairs 440.

As one non-limiting example, a query 254 including a textual string of "BrandX ParameterA ProductTypeZ" is received as part of an augmentation request 266 in the context of an e-commerce network environment. The catalog associated with the e-commerce environment includes two potential features, a product feature and brand feature. A feature identification engine 354 selects the product type feature as a target feature and generates a product type-specific query by removing the feature value corresponding to the brand feature (if present), e.g., removes the "BrandX" term from the query 254 to generate a product type-specific query including the text string "ParameterA ProductTypeZ". A set of three n-grams (e.g., two unigrams, one bigram) is generated from the product-type specific query and a set of 3*N n-gram/product type pairs are generated by combining each of the three n-grams with each value in a set of feature values for the product type feature, where N is a natural number. A similarity score, e.g., a cosine similarity, is calculated n-gram/product type pairs (e.g. three similarity scores are determined for each potential value of the product type feature). A set of product-type specific similarity scores is generated. The set of n-gram/product type pairs may be filtered to remove any n-gram/product type pairs having a similarity score below a first threshold. If at least one of the n-gram/product-type pairs has a similarity score equal to or greater than a second predetermined threshold, the feature identification engine 354 determines that a product type is present in the query 254 and generates a feature identified response 362 including the n-gram/product type pair having the highest-value (e.g., highest-ranked) similarity score. Alternatively, if none of the n-gram/product type pair has a similarity score equal to or greater than the second predetermined threshold, the feature identification engine 354 generates a feature missing response 360 including the product type associated with the n-gram/product type pair having the highest-ranked similarity score.

As another non-limiting example, a query 254 including a textual string of "QuantityA BrandB ParameterC ParameterD" is received as part of an augmentation request 266 in the context of an e-commerce network environment. The catalog associated with the e-commerce environment includes three potential features, a product feature, a brand feature, and an item quantity feature. A feature identification engine 354 selects the item quantity feature as a target feature and generates a quantity-specific query by removing the feature value corresponding to the brand feature e.g., "BrandB" to generate a quantity-specific query including the text string "QuantityA ParameterC ParameterD". A set of five n-grams (e.g., three unigrams, two bigrams) is generated from the quantity-specific query and a set of 5*N n-gram/quantity pairs are generated by combining each of the three n-grams with each value in a set of feature values for the quantity feature, where N is a natural number. A similarity score, e.g., a cosine similarity, is calculated for each n-gram/quantity pair (e.g. five similarity scores are determined for each potential value of the quantity feature). A set of quantity-specific similarity scores is generated including a similarity score for each n-gram/quantity pair. If at least one of the n-gram/quantity pairs has a similarity score equal to or greater than a predetermined threshold, the feature identification engine 354 determines that an item quantity is present in the query 254 and generates a feature identified response 362 including the n-gram associated with the highest-ranked (e.g., highest-value) n-gram/quantity pair. Alternatively, if none of the n-gram/quantity pairs has a similarity score equal to or greater than the second predetermined threshold, the feature identification engine 354 generates a feature missing response 360 including an empty result (e.g., an empty or null value for quantity).

With reference again to FIGS. 8-9, at step 306, an augmented query 270 is generated by adding, removing, and/or substituting one or more n-grams 430 for a feature value associated with at least one of the n-gram/feature value pairs and, at step 308, the augmented query 270 is output for use in further processing. In some embodiments, a query augmentation engine 356 is configured to add, remove, and/or substitute one or more n-grams 430 for a feature value associated with at least one of the n-gram/feature value pairs based on a received identification message. For example, if, at step 304, the feature identification engine 354 generates a feature identified response 362 indicating that a first feature is present in the query 254, the query augmentation engine 356 may be configured to substitute a feature value associated with a highest-ranked n-gram/feature value pair (e.g., a feature value included in the feature identified response 362) for the identified n-gram, e.g., if the query includes an n-gram "BrandX$_1$" and the feature identification engine 354 generates a feature identified response 362 identifying the n-gram "BrandX$_1$" and a feature value of "BrandX$_2$", the n-gram "BrandX$_1$" may be replaced with the n-gram "BrandX$_2$" to generate an augmented query 270. As another example, if, at step 304, the feature identification engine 354 generates a feature missing response 360 indicating that a first feature is not present in the query 254, the query augmentation engine 356 may be configured to add or append the feature value associated with the highest-ranked n-gram/feature value pair (e.g., the feature value included in the feature missing response 360) to the query 254 to generate the augmented query 270. It will be appreciated that the exact modification made to the query 254 by the query augmentation engine 356 may be based on the type of response received from the feature identification engine 354 and may include, but is not limited to, adding one or more terms to the query, removing one or more terms from the query, substitution one or more terms from the query, extending and/or truncating terms, etc.

In some embodiments, a feature value received in a response, e.g., a feature value included in a feature missing response 360 and/or a feature identified response 362, is used as a reference for a separate augmentation value to be added to the query 254. For example, in some embodiments, a received feature value includes a structure that is not query friendly, e.g., the feature value includes multiple terms or elements that would negatively impact search result generation, the received feature value can be mapped to a separate augmentation value that is added to a query 254 to generate an augmented query 270. For example, in the context of an e-commerce environment, a selected feature may include a product type feature and a feature value associated with a highest ranked n-gram/feature value pair may include a non-query friendly string. In such embodiments, an augmentation value, such as a shortened form, simpler form, and/or substitute form of the first product type value may be added to the query 254 to generate the augmented query 270, e.g., if the product type is "Mobile Phones and Accessories," an augmentation value of "mobile phone" or "cellphones" may be added to the query 254 in place of the product type "Mobile Phones and Accessories." It will be appreciated that any suitable augmentation value can be substituted for a feature value during query augmentation. At step 308, the augmented query 270 is output from the query augmentation engine 268 for use in further processing, as discussed in greater detail herein.

In some embodiments, a set of item-specific augmented values may be generated utilizing the disclosed query enrichment method 300. For example, in some embodiments, a set of raw (e.g., historical non-augmented) queries associated with a selected pick item are provided to a query augmentation engine 268. In some embodiments, the set of raw queries includes a set of N top queries associated with the selected pick item. The query augmentation engine 268 is configured to identify a product type for each query in the set of raw queries according to the query enrichment method 300 discussed above. The query augmentation engine 268 may be configured to select a product type associated with a top ranked n-gram/product type as an augmentation product type associated with the selected pick item.

With reference again to FIGS. 6-7, at optional step 206, a set of search results 274 responsive to the query 254 and/or the augmented query 270 is generated. The search results 274 can be generated utilizing any suitable search models and/or search generation process. For example, in various embodiments, a search engine 272 is configured to implement one or more trained search models. The trained search models can include any suitable search framework, such as, for example, Bidirectional Encoder Representations from Transformers (BERT) models, RankBrain models, LaMDA, etc.

At step 208, at least one pick item 278 and at least one associated enhancement interface element 262 are selected for inclusion in an enhanced interface 260. The at least one pick item 278 includes an item or items selected for (e.g., identified for) display on an enhanced interface 260 in conjunction with and/or as part of an enhancement interface element 262. In some embodiments, the at least one pick item 278 and/or the associated enhancement interface element 262 are selected by an enhancement engine 280.

Figure 13:
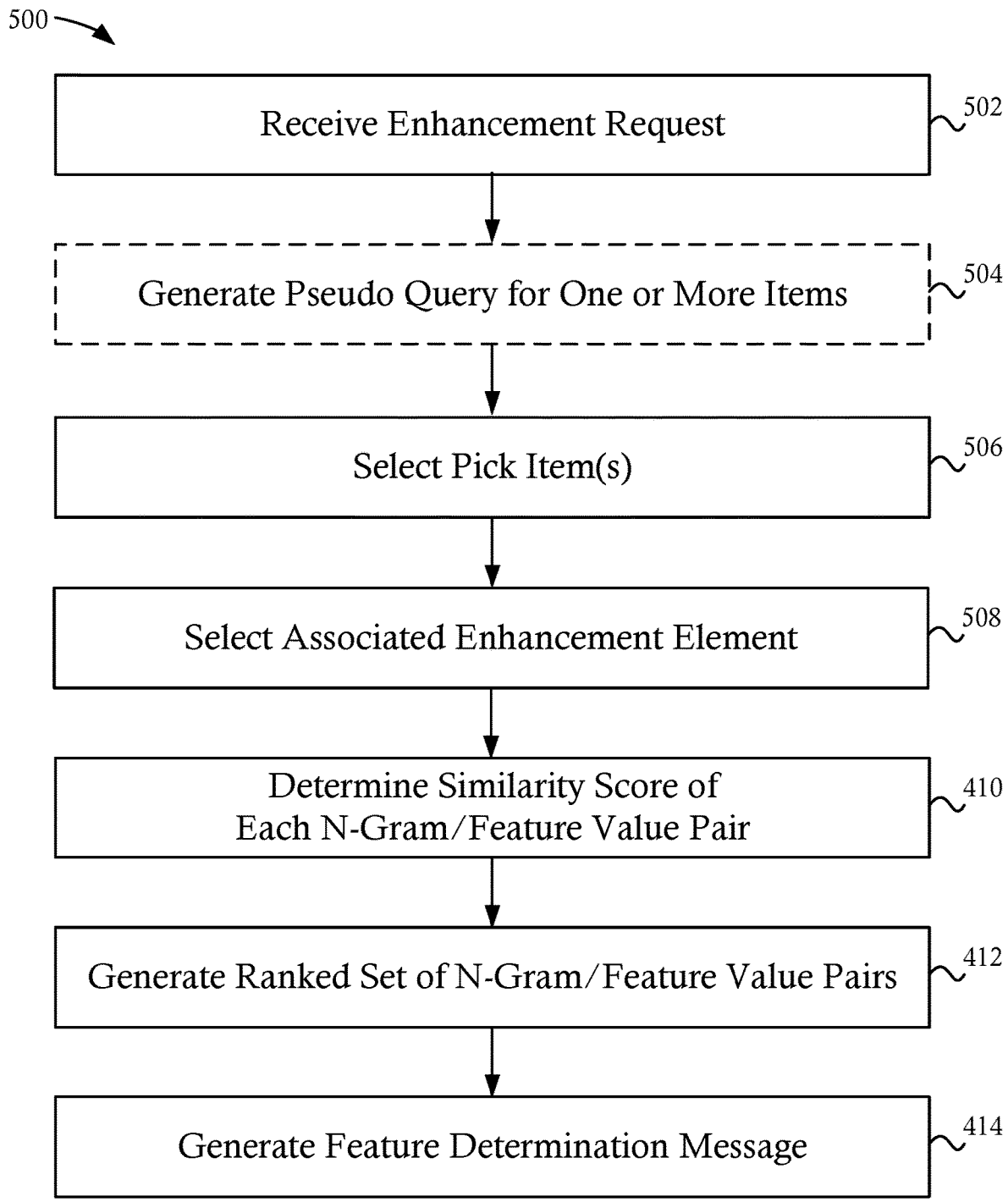
FIG. 13 is a flowchart illustrating a pick item enhancement method, in accordance with some embodiments.
Figure 14:
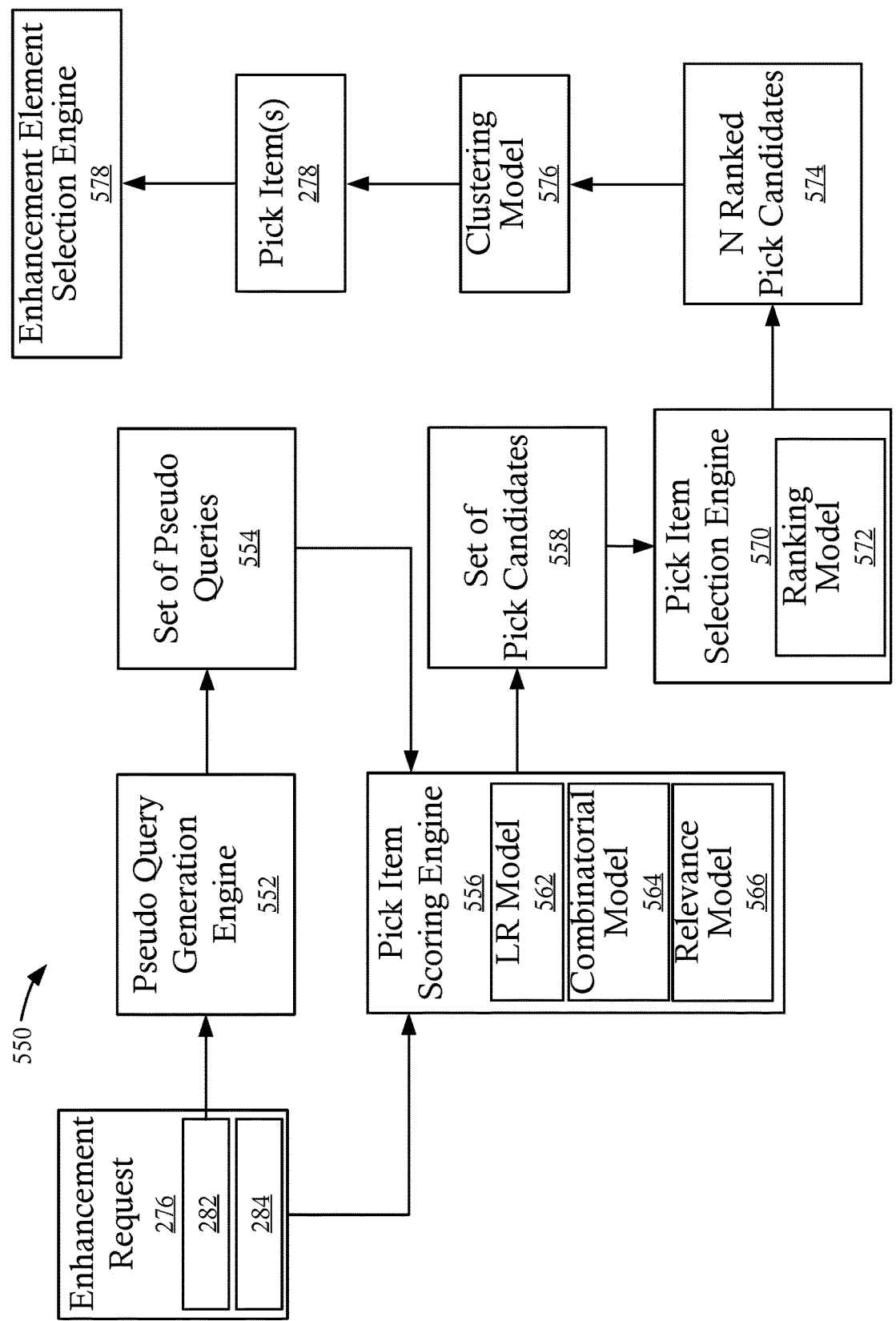
FIG. 14 is a process flow illustrating various steps of the pick item enhancement method of FIG. 13, in accordance with some embodiments.

The enhancement engine 280 may be configured to implement a pick item enhancement method 500, as illustrated in FIG. 13, in accordance with some embodiments. FIG. 14 illustrates a process flow 550 including one or more of the steps of the item enhancement method 500. At step 502, an enhancement request 276 is received. The enhancement request 276 may include data identifying one or more candidate items 282 and/or a target query 284. A candidate item 282 includes an item (e.g., an item interface element associated with an item in a catalog) that may potentially be displayed with and/or in conjunction with one or more enhancement interface elements 262. In some embodiments, the one or more candidate items 282 may include at least a portion of the search results 274 (e.g., a subset of N items selected from the search results 274), a set of recommended items generated by a recommendation engine (not shown), an anchor item included in an interface request 252, and/or any other selected and/or predetermined items and/or item identifiers. In some embodiments, the enhancement request 276 includes a target query 284, such as a query 254 and/or an augmented query 270.

At optional step 504, a pseudo query 554 is generated for each of the one or more candidate items 282. For example, pseudo queries 554 may be generated for each of the one or more candidate items 282 included in an enhancement request 276 when the enhancement request 276 omits a query. A pseudo query 554 may be generated by a pseudo query generation module 552 according to any suitable process and may have any suitable format. For example, as discussed above, a pseudo query 554 of type <feature 1, feature 2>, such as <brand, product type> in the context of an e-commerce environment, may be generated for one or more items, such as the one or more candidate items 282. The pseudo query generation module 552 may be configured to implement any suitable process, model, etc., to generate a pseudo query 554 for each of the one or more candidate items 282.

At step 506, one or more pick items 278 are selected from the one or more candidate items 282. The one or more pick items 278 may be selected, at least in part, based on a candidate score (CS) including a composite and/or sequential combination of two or more sub-scores, such as a logistical regression (LR) score, an item global (IG) score, and/or a relevance score. In some embodiments, the enhancement engine 280 includes and/or implements a pick item scoring engine 556 configured to implement one or more trained machine learning frameworks configured to generate one or more scores, such as, for example, a logistical regression model 562 configured to generate the LR score, a combinatorial model 564 configured to generate the IG score, and/or a relevance model 566 configured to generate the relevance score.

The pick item scoring engine 556 may be configured to receive one or more features associated with each of the one or more candidate items 282. In some embodiments, the input features include historical interaction features associated with the candidate items 282. Interaction features can include any suitable session and/or interaction metrics. For example, in the context of an e-commerce environment, historical interaction features can include, but are not limited to, add-to-cart (ATC) interactions, click interactions, purchase interactions, engagement metrics, return interactions, rating interactions/metrics, review interactions, etc. In some embodiments, the input features include item-specific features associated with one or more candidate items 282. For example, in the context of an e-commerce environment, item-specific features can include, but are not limited to, title, brand, product type, global product type, flavor, size, color, product category, etc.

In some embodiments, the pick item scoring engine 556 includes and/or is configured to implement a trained logistical regression model 562 (also referred to herein as a trained logistical regression framework) to generate a LR score. The trained logistical regression model 562 may be trained (for example, according to the iterative training process discussed below) utilizing a loss function defined as:

$$\text{loss} = -\frac{1}{N} \sum_{i=1}^{N} w_i^{pos} y_i \log(p(y_i)) + w_i^{neg}(1-y_i)\log(1-p(y_i))$$

where $y_i$ represents a class and $p(y_i)$ is the probability of the class within the trained logistical regression model 562, N is a number of samples in the data, $w_i^{pos}$ is a number of first interactions associated with the item (e.g., a number of add-to-cart interactions), and $w_i^{neg}$ is the number of second interactions associated with an item minus the number of first interactions (e.g., a number of impressions for an item minus the number of add-to-cart interactions). The positive (e.g., $w_i^{pos}$) and negative (e.g., $w_i^{neg}$) labels may be determined on a query-item level.

In some embodiments, the pick item scoring engine 556 includes and/or is configured to implement a trained combinatorial model 564 (also referred to herein as a combinatorial framework) to generate an IG score. The IG score may be calculated as:

$$IG=f_1(\text{first interactions,second interactions}, \ldots, nth \text{ interactions})$$

where each of the interactions corresponds to a tracked historical interaction for a selected candidate item 282. For example, in some embodiments and in the context of an e-commerce environment, the first interaction includes purchase interactions for a candidate item 282, the second interactions include return interactions for the candidate item 282, and the third (e.g., nth) interactions include ratings of the candidate item 282. The coefficients of the function $f_1$ may be determined by an iterative training process, as discussed in greater detail below.

In some embodiments, the pick item scoring engine 556 includes and/or is configured to implement a trained relevance model 566 or framework to generate a relevance score for each candidate item 282. The relevance score may be representative of match between query intent and item results. In some embodiments, the relevance score is calculated as:

$$\text{relevance\_score} = \frac{\text{feature\_interaction\_count}}{\text{query\_interaction\_count}}$$

where the feature interaction count is representative of a number of a first type of interactions for a first feature related to a candidate item 282 and the query interaction count is representative of a number of the first type of interactions for a query (e.g., query 254, enhanced query 270, pseudo query, etc.). For example, in the context of an e-commerce environment, the feature interaction count may include a product type add-to-cart count and the query interaction count may include a query add-to-cart count. Although specific embodiments are discussed herein, it will be appreciated that any suitable features and/or interactions may be utilized to generate a relevance score.

In some embodiments, a relevance score is determined based on a query-item text match between a query (e.g., query 254, enhanced query 270, pseudo query, etc.) and a candidate item 282. The query-item text match may be performed utilizing tokens (e.g., token embeddings) generated each query and item. For example, in various embodiments, item tokens may be generated using item features such as a title, brand, flavor, product type, global product type, product category, product family, etc. In some embodiments, query tokens may be generated for each word and/or element in a query.

In some embodiments, the pick item scoring engine 556 is configured to generate a composite candidate score (CS) by combining two or more other scores, such as the LR score, the IG score, and/or the relevance score, e.g.:

$$CS=f_2(LR \text{ Score,Item Global Score,Relevance Score})$$

The parameters of the function $f_2$ may be selected according to an iterative machine learning training process. In some embodiments, the pick item scoring engine 556 may be configured to output a set of pick candidates 558 including the set of candidate items 282 and an associated CS for each of the candidate items 282.

In some embodiments, the pick item scoring engine 556 is configured to sequentially apply two or more score generation processes to generate a CS score. For example, in some embodiments, the pick item scoring engine 556 receives a set of candidate items 282 and applies a logistical regression framework to identify a set of top-k candidates, where k is a natural number. The pick item scoring engine 556 may further generate a candidate score for each of the top-k candidates. In some embodiments, the candidate score is determined based on functional combination of an IG Score and a Relevance Score. The pick item scoring engine 556 may be configured to output a set of pick candidates 558 including the set of top-k candidates and an associated CS for each of the top-k candidates.

In some embodiments, one or more pick items 278 are selected from the set of pick candidates 558. For example, in some embodiments, a pick item selection module 570 includes and/or implements a ranking model 572 configured to rank each item in the set of pick candidates 558 by an associated candidate score. The ranking model 572 can include any suitable ranking framework, such as, for example, an algorithmic ranking framework (e.g., a sorting framework), a machine learning framework (e.g., a learn to rank framework), and/or any other suitable ranking framework. The ranking model 572 is configured to receive the set of pick candidates and generate a ranked set of the pick candidates ranked by the associated candidate score.

In some embodiments, the pick item selection module 570 is configured to select a set of the N highest ranked pick candidate items 574 as one or more output pick items 278, where N is a natural number. For example, in some embodiments, the pick item selection module 570 is configured to select the top ranked pick candidate item, the top two ranked pick candidate items, the top five ranked pick candidate items, etc. as an output set of pick items 278. In some embodiments, the pick item selection module 570 is configured to standardize and/or normalize the output pick item 278. For example, in some embodiments, the pick item selection module 570 is configured to standardize the output pick item based on an a target query 284 included in the enhancement request 276 and/or a pseudo query 554.

For example, in some embodiments, a clustering model 576 is configured to receive the set of the N highest ranked pick candidate items 574 and an associated query 283, 554 and generate a pick item 278 selected from the set of the N highest ranked pick candidate items 574. In some embodiments, the clustering model 576 is configured to cluster the query 284, 554 into one of a plurality of predetermined clusters and output a cluster item associated with the selected item as the pick item 278 when the cluster item matches one of the N highest ranked pick candidate items 574. As one non-limiting example, in some embodiments, a set of the N highest ranked pick candidate items 574 including 3 candidate items is identified based on a candidate score ranking as discussed above. The top 3 candidate items and an associated query may be input to a clustering model 576, which assigns the associated query to a first cluster having a first cluster item. If the first cluster item matches one of the top 3 candidate items, the first cluster item is output as a pick item 278, regardless of whether one of the top 3 candidate items was ranked higher than the corresponding first cluster item. In some embodiments, if the cluster item does not match any of the top 3 candidate items, the top ranked candidate item may be output as the pick item 278. Alternatively, in some embodiments, if the cluster item does not match any of the top 3 candidate items, the cluster item may be output as the pick item 278.

Figure 15:
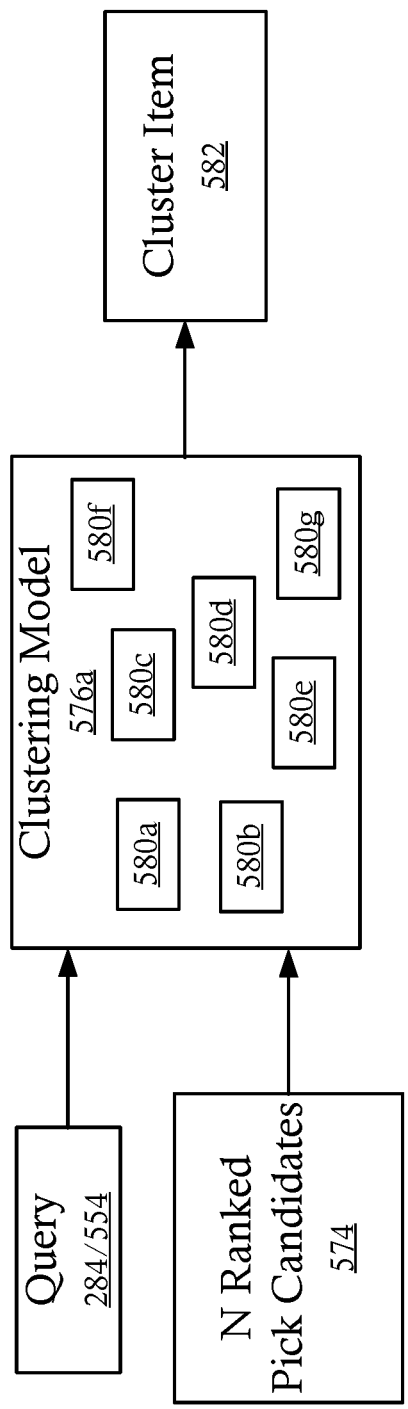
FIG. 15 is a process flow illustrating operation of a trained clustering model, in accordance with some embodiments.

FIG. 15 illustrates operation of a trained clustering model 576a, in accordance with some embodiments. The trained clustering model 576a is configured to receive one or more inputs, such as a query 284, 554 and a set of the N highest ranked pick candidate items 574 identified for the query 284, 554. In some embodiments, the trained clustering model 576a is further configured to generate an output including the query 284, 554 and a pick item 278. As illustrated in FIG. 15, a trained clustering model 576a includes a plurality of clusters 580a-580g (collectively "clusters 580"), each having a cluster item associated therewith. The clusters 580 are defined during iterative training of the trained clustering model 576a based on a training dataset. The trained clustering model 576a may be generated (e.g., trained) utilizing a training dataset including a set of historical queries. The historical queries can include, but are not limited to, a set of the top M queries received over a predetermined time period, where M is a natural number and the predetermined time period is a past period. For example, in some embodiments, M may be equal to 1, 2, 3, 5, 7, 10, etc. and the predetermined time period may be the past week, past month, past season, past quarter, etc.

The trained clustering model 576 is configured to classify (e.g., categorize/assign) the received query 284, 554 into one of the predetermined clusters 580. After selecting an assigned cluster, e.g., cluster 580a, the trained clustering model 576a and/or the enhancement engine 280, may be configured to compare the set of the N highest ranked pick candidate items 586 and the cluster item 582 associated with the assigned cluster 580a to select a pick item 278. If one of the N highest ranked pick candidate items 574 matches, the trained clustering model 576a generates an output including the query 284, 554 and the cluster item 582 associated with the assigned cluster 580a. If none of the N highest ranked pick candidate items 574 match the cluster item 582 associated with the assigned cluster 580a, the trained clustering model 576a and/or the enhancement engine 280 may be configured to output the N highest ranked pick candidate item 574 having the highest candidate score. Alternatively, in some embodiments, If none of the N highest ranked pick candidate items 574 match the cluster item 582 associated with the assigned cluster 580a, the trained clustering model 576a and/or the enhancement engine 280 may be configured to output the cluster item 582 associated with the assigned cluster 580a.

In some embodiments, a trained clustering model 576 includes a multipartite graph framework, such as a bi-partite graph. A bi-partite graph framework may include a first set of vertices (or nodes) representative of queries (e.g., historical queries included in the training dataset) and a second set of vertices (or nodes) representative of items (e.g., items in a catalog associated with a network environment). Each of the first vertices is connected to one or more of the second vertices by an edge. Each of the edges indicates (i.e., represents) that the item associated with the connected one of the second vertices is a pick item and/or candidate item for the query associated with the connected one of the first vertices.

With reference again to FIGS. 13-14, at step 508, at least one enhancement interface element 262 is selected for display and/or inclusion with each of the one or more pick items 278. For example, in some embodiments, the enhancement engine 280 includes an enhancement element selection engine 578 configured to select one of a plurality of enhancement elements for display with a selected pick item 278. As another example, in some embodiments, the enhancement engine 280 includes one or more enhancement element specific models and/or frameworks. For example, the enhancement engine 280 may include two or more enhancement element-specific pick item scoring engines 556 and/or two or more enhancement element-specific pick item selection module 570. Each of the enhancement element-specific pick item scoring engines 556 and/or each of the two or more enhancement element-specific pick item selection modules 570 may be generated using enhancement element-specific training datasets (e.g., each may include one or more of an LR framework, a combinatorial framework, a relevance framework, and/or a clustering model trained and/or tuned for a specific enhancement interface element). An enhancement request 276 may include identification of one or more enhancement interface elements 262 and the enhancement engine 280 may be configured to implement the enhancement element-specific pick item scoring engine(s) 556 and/or the enhancement element-specific pick item selection module(s) 570 corresponding to the identified enhancement elements.

As one non-limiting example, an enhancement engine 280 may be configured to implement and/or include a first enhancement element-specific pick item scoring module for a first enhancement interface element, such as a "Popular Pick" badge, and a second enhancement element-specific pick item scoring module for a second enhancement interface element, such as a "Best Seller" badge. A pick item 278 identified by utilizing the first enhancement element-specific pick item scoring module associated with "Popular Pick" badge may be different than a pick item 278 identified by utilizing the second enhancement element-specific pick item scoring module associated with "Best Seller" badge for the same query or input. In some embodiments, enhancement element-specific modules are selected based on a page type to be generated by an interface generation engine 258 in response to the interface request 252.

As another example, in some embodiments, an enhancement interface element may be assigned to each pick item 278 based on a context of an enhanced interface 260 to be generated by an interface generation engine 258 in response to the interface request. For example, in some embodiments, a predetermined set of enhancement interface elements may be available for a specific page type, such as one or more first badges being assigned to a first page type (e.g., search-related badges being assigned to a search page type) and one or more second badges being assigned to a second page type (e.g., user-relevance badges being assigned to a home page). The set of badges associated with the selected page type may be applied sequentially, randomly, and/or according to one or more predefined criteria to the one or more pick items 278.

As yet another example, in some embodiments, each selected pick item 278 may include a set of associated enhancement interface elements applicable to the selected item. For example, in some embodiments, a first pick item may be associated with a "Best Seller" badge for a first item category and a second pick item may be associated with a "Popular Pick" badge for a second item category. When the first and/or second pick items are selected for display, e.g., are output as a pick item 278, the output may also include the enhancement interface element associated with the selected pick item.

As yet another example, in some embodiments, the enhancement engine 280 provides at least one pick item 278 to the interface generation engine 258, which is configured to identify an enhancement interface element 262 for the selected pick item 278 based on the interface context and/or additional data included in the interface request 252.

At step 210, the interface generation engine 258 generates an enhanced interface 260 including at least one item interface element 264, e.g., item interface element 264a, representative of the at least one pick item 278. The selected item interface element 264a is provided (e.g., rendered, displayed, etc.) in conjunction with the associated enhancement interface element 262. In some embodiments, the interface generation engine 258 is configured to align the enhancement interface element 262 with at least a portion of the selected item interface element 264a such that the enhancement interface element 262 overlays at least a portion of the selected item interface element 264a. In some embodiments, the interface generation engine 258 is configured to provide instructions to the user computing device 16 that generated the initial interface request 252. The instructions are configured to cause the user computing device 16 to render the enhanced interface 260 on a display device associated with the user computing device 16.

In some embodiments, the enhancement interface element 262 includes a badge element and a contextual element. The badge element can include a predetermined textual or graphic badge providing additional context or information to a user via the user interface (e.g., enhancing the interface for the user). Examples of textual badges can include, but are not limited to, "Popular Pick," "Best Seller," "Hot," etc. Although specific embodiments are discussed herein, it will be appreciated that the textual and/or graphical badges may be selected based on the context of the network environment and/or specific operations within the network environment.

In some embodiments, the enhancement interface element 262 includes a contextual element configured to provide contextual information regarding selection of the badge element and/or the corresponding pick item interface element. For example, in some embodiments, the contextual element includes at least a portion of an augmented query 270 generated by a query enrichment method 300, as discussed above. The contextual element can be configured to display a relevant and/or selected portion of the augmented query 270, such as, for example, a portion of the augmented query 270 corresponding to a product type, brand, and/or other feature associated with the item represented by the corresponding item interface element 264a. In some embodiments, the contextual element 292 includes a "roll-over" interface element that is typically hidden (e.g., not displayed) unless and until a user performs a predetermined interaction with the enhanced interface 260, such as, for example, hovering (or pausing) a cursor over the badge element of the enhancement interface element 262. In some embodiments, the contextual element is displayed in conjunction with (e.g., adjacent to) the badge element.

In some embodiments, the interface generation engine 258 is configured to populate the generated enhanced interface 260 with additional interface elements. For example, in various embodiments, the additional interface elements can include item interface elements representative at least a portion of the items identified in the search results 274, at least a portion of the items identified in item recommendations, etc. As discussed in greater detail below, a generated enhancement interface can include any set of interface elements associated with and/or selected for a given page context.

Identification of item interface elements relevant to a user context can be burdensome and time consuming for users, especially where augmented interfaces fail to provide contextual information for assignment of interface elements and non-standardized badging. Typically, a user can locate information regarding items in search results by navigating a browse structure, sometimes referred to as a "browse tree," in which interface pages or elements are arranged in a predetermined hierarchy. Such browse trees typically include multiple hierarchical levels, requiring users to navigate through several levels of browse nodes or pages to arrive at an interface page of interest. Thus, the user frequently has to perform numerous navigational steps to arrive at a page containing information regarding items that are relevant to the user's context or that provide user-relevant augmentation and badging.

Systems configured to generate enhanced interface pages, as disclosed herein, significantly reduce this problem, allowing users to locate item interface elements that are relevant to the user context with fewer, or in some case no, active steps. For example, in some embodiments described herein, when a user is presented with search results including item interface elements, each interface element includes, or is in the form of, a link to an interface page for an associated item in the catalog. Each item interface element thus serves as a programmatically selected navigational shortcut to an interface page, allowing a user to bypass the navigational structure of the browse tree. Beneficially, programmatically identifying pick items and presenting a user with enhancement interface elements associated with a pick item navigation shortcuts to these tasks can improve the speed of the user's navigation through an electronic interface, rather than requiring the user to page through multiple other pages in order to locate items relevant to the user context or having appropriate badging/augmentation via the browse tree or via an unenhanced search function. This can be particularly beneficial for computing devices with small screens, where fewer interface elements can be displayed to a user at a time and thus navigation of larger volumes of data is more difficult.

At optional step 212, after the enhanced interface 260 is provided to a user computing device that generated the initial interface request 252, such as, for example, user computing device 16, feedback data 296 representative of one or more user interactions with the generated enhanced interface 260 is received from the user computing device 16. For example, in some embodiments, feedback data 296 may include, but is not limited to, one or more click interactions, one or more add-to-cart interactions, one or more purchase interactions, etc. The interactions may be related to an item interface element displayed in conjunction with an enhancement interface element and/or may be related to other interactions with the enhanced interface 260.

In some embodiments, at step 214, the feedback data 296 is provided to a model update engine 298 to update one or more machine learning models. For example, the feedback data 296 may be utilized by the model update engine 298 to update one or more trained machine learning models implemented by a search engine 272, a n-gram generation module, a similarity score module, a ranking module, a trained embedding generation model, a clustering model, etc. It will be appreciated that any suitable interaction feedback data 296 may be utilized to update one or more of the models described herein.

Figure 16:
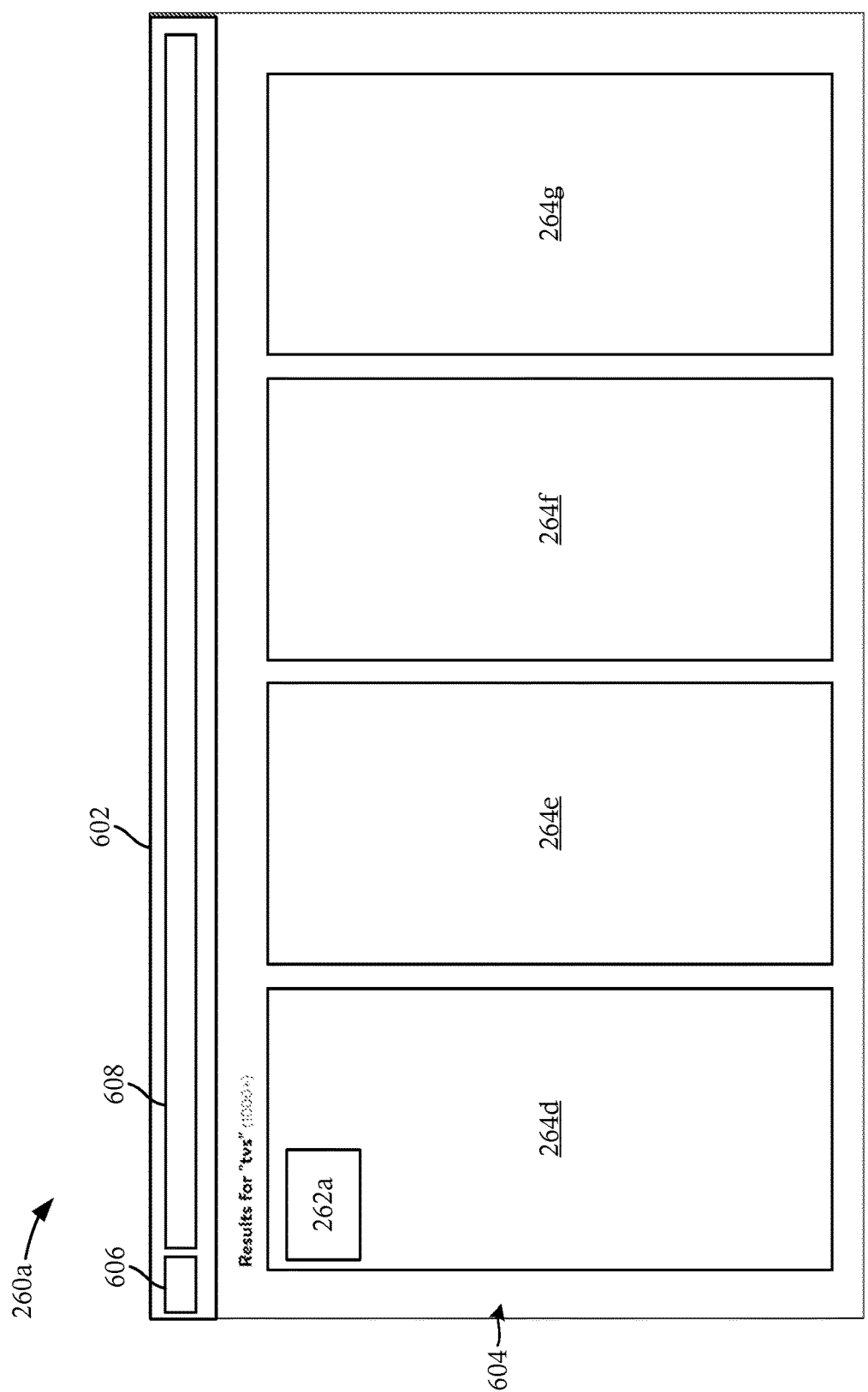
FIG. 16 illustrates an enhanced search interface page, in accordance with some embodiments.

FIG. 16 illustrates an enhanced search interface 260a, in accordance with some embodiments. The enhanced search interface 260a includes a search bar 602 and a set of search results 604. The search bar 602 includes an interface area configured to receive one or more user inputs, such as, for example, a category selection 606 and a textual query 608. Although embodiments are discussed herein including a search bar 602, it will be appreciated that an enhanced search interface 260a can include any suitable input, such as textual, voice, etc., and/or can omit the search bar 602.

The set of search results 604 include item interface elements 264d-264g corresponding to responsive items identified by a search engine, such as search engine 272, in response to the textual query 608. In the illustrated embodiment, the first item interface element 264e comprises a pick item and is displayed in conjunction with an enhancement interface element 262a. The enhancement interface element 262a includes a badge element displayed in conjunction with (e.g., vertically aligned with) the corresponding first enhancement interface element 262e.

Figure 17:
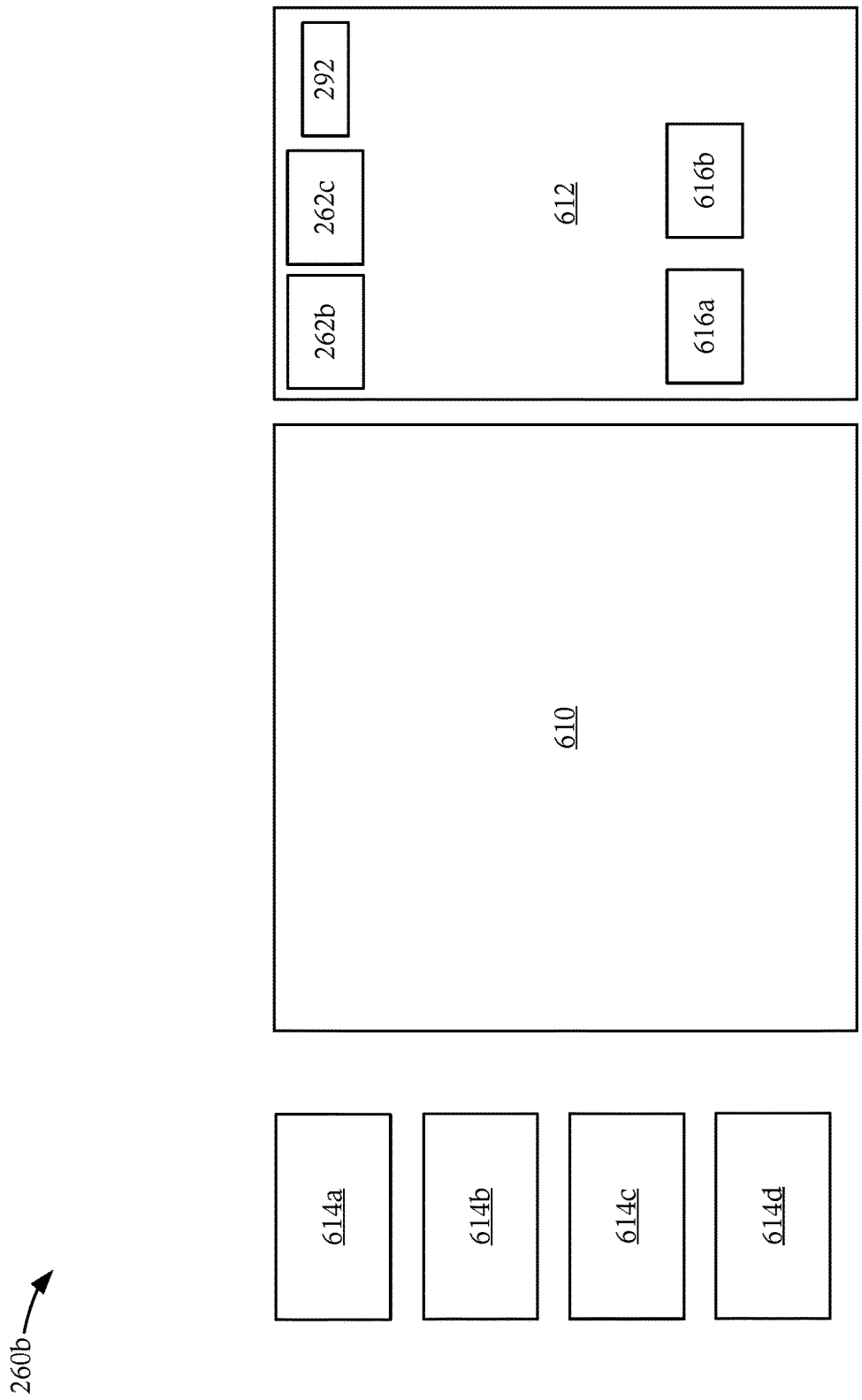
FIG. 17 illustrates an enhanced catalog page interface, in accordance with some embodiments.

FIG. 17 illustrates an enhanced catalog page interface 260b, in accordance with some embodiments. The enhanced catalog page interface 260b includes item interaction interface elements 610, 612, 614a-614d related to a specific item from a catalog associated with the network interface. An item interaction interface element 612 includes an interface area configured to receive one or more inputs, such as, for example, a user selection of one or more displayed interaction interface elements 616a, 616b. The displayed interaction interface elements 616a, 616b may include any suitable interaction element, such as, for example, one or more buttons.

The item interaction interface element 612 includes two enhancement interface elements 262b, 262c overlayed atop a portion of the item interaction interface element 612. In the illustrated embodiment, each of the enhancement interface elements 262b, 262c include a badge element overlayed atop the item interaction interface element 612. The item interaction interface element 612 further includes a contextual element 292 related to the enhancement interface elements 262b, 262c and overlayed atop a portion of the item interaction interface element 612. The contextual element 292 can include a textual element indicating a context for the selected enhancement interface elements 262b, 262c, e.g., indicating that certain badges were selected based on a category context of the represented item, e.g., for a product category "tv."

Figure 18:
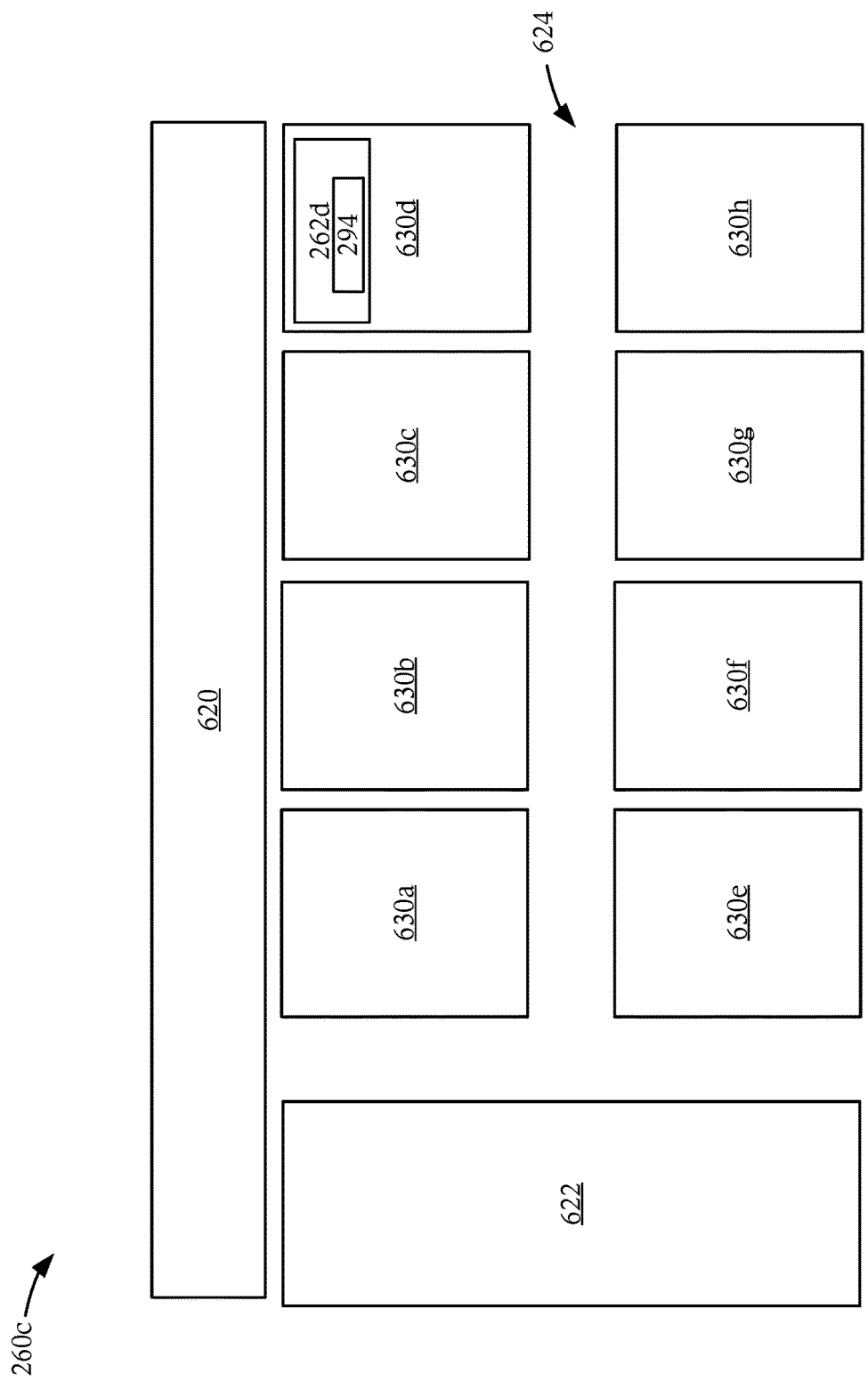
FIG. 18 illustrates an enhanced browse page interface, in accordance with some embodiments.

FIG. 18 illustrates an enhanced browse page interface 260c, in accordance with some embodiments. The enhanced browse page interface 260c includes a header portion 620, a filter portion 622, and a catalog portion 624. The header portion 620 includes one or more interaction interface elements configured to receive user interactions to define a portion of a catalog to be displayed in the catalog portion. The filter portion 622 can include one or more interaction interface elements configured to receive user interactions to limit or filter the portion of the catalog to be displayed in the catalog portion 624. In some embodiments, the one or more interaction interface elements provided in the catalog portion 624 are adjusted dynamically, for example, due to interactions with one or more interaction interface elements located in the header portion 620 and/or the catalog portion 624.

In some embodiments, the catalog portion 624 is configured to display one or more item interface elements 630a-630h. Each of the item interface elements 630a-630h includes a programmatically selected interface element representative of at least one item included in an item catalog related to the enhanced browse page interface 260c. Each of the item interface elements 630a-630h can include a programmatic shortcut to one or more additional pages and/or interactions with a network interface, such as, for example, providing a transition to an enhanced catalog page interface 260b related to a selected item interface element 630a, an add-to-cart interaction element allowing an add-to-cart interaction from the enhanced browse page interface 260c, and/or any other suitable programmatic interface shortcuts.

The catalog portion 624 includes at least one enhancement interface element 262d displayed in conjunction with (e.g., aligned with and/or overlayed atop) at least one of the item interface elements 630d. The enhancement interface element 262d includes a textual element 294 configured to provide contextual information related to the corresponding item interface element 630d. For example, in the illustrated embodiment, the textual element 294 is configured to display contextual information related to certain interactions, e.g., purchase interactions, that have been performed for the underlying item within the corresponding network interface over a predetermined time period. It will be appreciated that a textual element 294 can be configured to provide any suitable contextual information or badging related to one or more tracked interactions.

Figure 19:
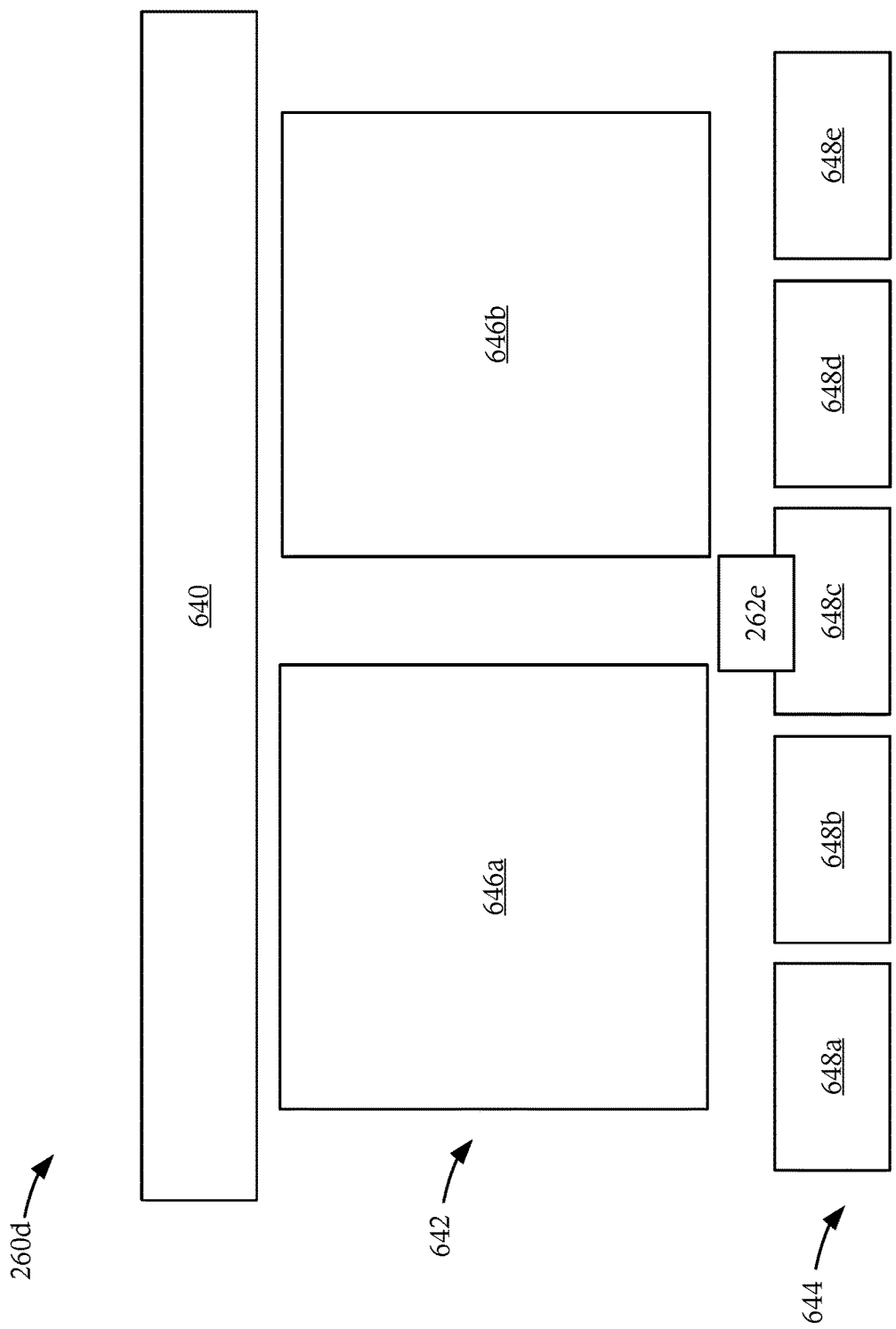
FIG. 19 illustrates an enhanced category page interface, in accordance with some embodiments.

FIG. 19 illustrates an enhanced category page 260d, in accordance with some embodiments. The enhanced category page 260d includes a header portion 640, a category portion 642, and a category-specific item portion 644. The header portion 640 may be configured to provide category-selection interface elements related to one or more predetermined content categories, such as, for example, seasonal categories, holiday categories, product categories, event categories, etc. Selection of one of the category-selection interface elements causes the category portion 642 and/or the category-specific item portion 644 to display interface elements related to and/or categorized in the selected category associated with the selected category-selection interface element. The category portion 642 may be configured to illustrates category-specific interface elements 646a-646b configured to provide navigational shortcuts to one or more additional interface pages including interface elements related to and/or categorized as part of a specific category, such as a category identified through interaction with one of the category-selection interface elements of the header portion 640.

In some embodiments, the category-specific item portion 644 includes category-specific item interface elements 648a-648e each representative of an item that is associated with and/or categorized as part of a specific category, such as a category identified through interaction with one of the category-selection interface elements. Each of the category-specific item interface elements 648a-648e may include a programmatic shortcut to one or more additional pages and/or interactions with a network interface, such as, for example, providing a transition to an enhanced catalog page interface 260b related to a selected category-specific item interface element 648c, an add-to-cart interaction element allowing an add-to-cart interaction from the enhanced category page 260d, and/or any other suitable programmatic interface shortcuts. The category-specific item portion 644 includes at least one enhancement interface element 262e displayed in conjunction with (e.g., aligned with and/or overlayed atop) at least one of the category-specific item interface elements 648c. The enhancement interface element 262e includes a badge element displayed in conjunction with (e.g., aligned with and/or overlayed atop) the category-specific item interface elements 648c.

Figure 20:
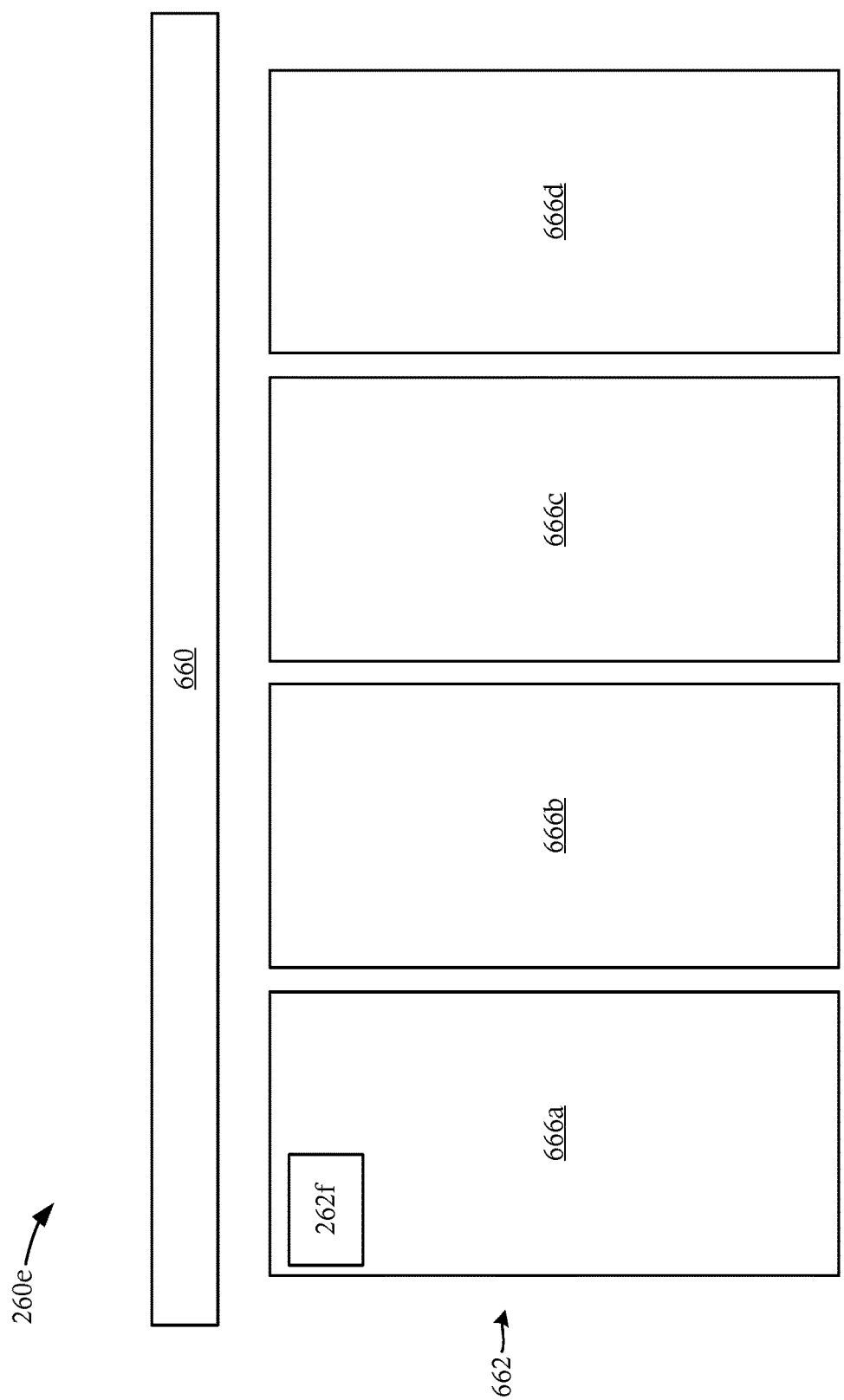
FIG. 20 illustrates an enhanced home page interface, in accordance with some embodiments.

FIG. 20 illustrates an enhanced home page interface 260e, in accordance with some embodiments. The enhanced home page interface 260e includes a header portion 660 and a relevant-item portion 662. The header portion 660 may be configured to display one or more contextual interface elements. The contextual interface elements may be selected using any suitable selection process, such as, for example, a selection process based on historical user interactions, user context, etc.

In some embodiments, the relevant-item portion 662 includes a plurality of relevant-item interface elements 666a-666d. Each of the relevant-item interface elements 666a-666d may include a programmatic shortcut to one or more additional pages and/or interactions with a network interface, such as, for example, providing a transition to an enhanced catalog page interface 260b related to a selected category-specific item interface element 666a, an add-to-cart interaction element allowing an add-to-cart interaction from the enhanced home page interface 260e, and/or any other suitable programmatic interface shortcuts. In some embodiments, the relevant-item interface elements 666a-666d are selected in response to user-specific search history.

In some embodiments, a determination is made whether a user profile maintained by a network interface, such as a user profile stored in a database 14, has prior interaction and/or query activity. For example, a user computing device 16, 18, 20 may interact with one or more interface pages of a network interface to conduct searches, select items, purchase items, etc. Each of the interactions may be recorded and/or otherwise stored by the network interface as part of a user profile associated with one or more of the user computing devices 16, 18, 20. A user profile associated with the user computing device 16, 18, 20 may be obtained and utilized to customize an interface during subsequent interactions with the network interface from the user computing device 16, 18, 20.

In some embodiments, if the determination indicates that a user profile does not include sufficient interaction and/or query history (e.g., a user profile associated with a relevant user computing device 16, 18, 20 does not exist in the database 14, a user profile is present but has historical interaction and/or query history below a predetermined threshold, etc.), the relevant-item interface elements 666a-666d may be selected by a recommendation engine configure to utilize non-user specific signals. If the determination indicates that a user profile has sufficient interaction and/or query history, at least one of the relevant-item interface elements 666a-666d may be selected by a recommendation engine configured to, at least in part, utilize user-specific signals based on the historical interaction and/or query data. Additionally and/or alternatively, if the determination indicates that a user profile has sufficient interaction and/or query history, at least one of the relevant-item interface elements 666a-666d may be selected by identifying pick items assigned to queries that are similar to (e.g., clustered with) user-specific historical queries. For example, as discussed above, a clustering model 576 can be configured to cluster a received query in a cluster associated with at least one pick item. User historical queries may be provided to the clustering model 576 and assigned to a cluster having a pick item associated therewith. A set of N historical queries may be used to generate a set of N pick items and one or more of the relevant-item interface elements may be representative of one of the N pick items.

In some embodiments, the relevant-item portion 662 includes at least one enhancement interface element 262f displayed in conjunction with (e.g., aligned with and/or overlayed atop) at least one of the relevant-item interface elements 666a. In the illustrated embodiment, the enhancement interface element 262f includes a badge element displayed in conjunction with (e.g., aligned with and/or overlayed atop) a relevant-item interface elements 666a. Although specific embodiments of enhanced interface pages 260a-260e having specific embodiments of enhancement interface elements 262a-262f are discussed herein, it will be appreciated that any suitable interface page can be modified according to the disclosed systems and methods to be an enhanced interface page including one or more enhancement interface elements. Further, it will be appreciated that an enhancement interface element can include any suitable form configured to provide the advantages of the disclosed systems and methods, such as providing an improved user interface that reduces user navigation time and provides for faster identification of relevant interaction elements.

Figure 21:
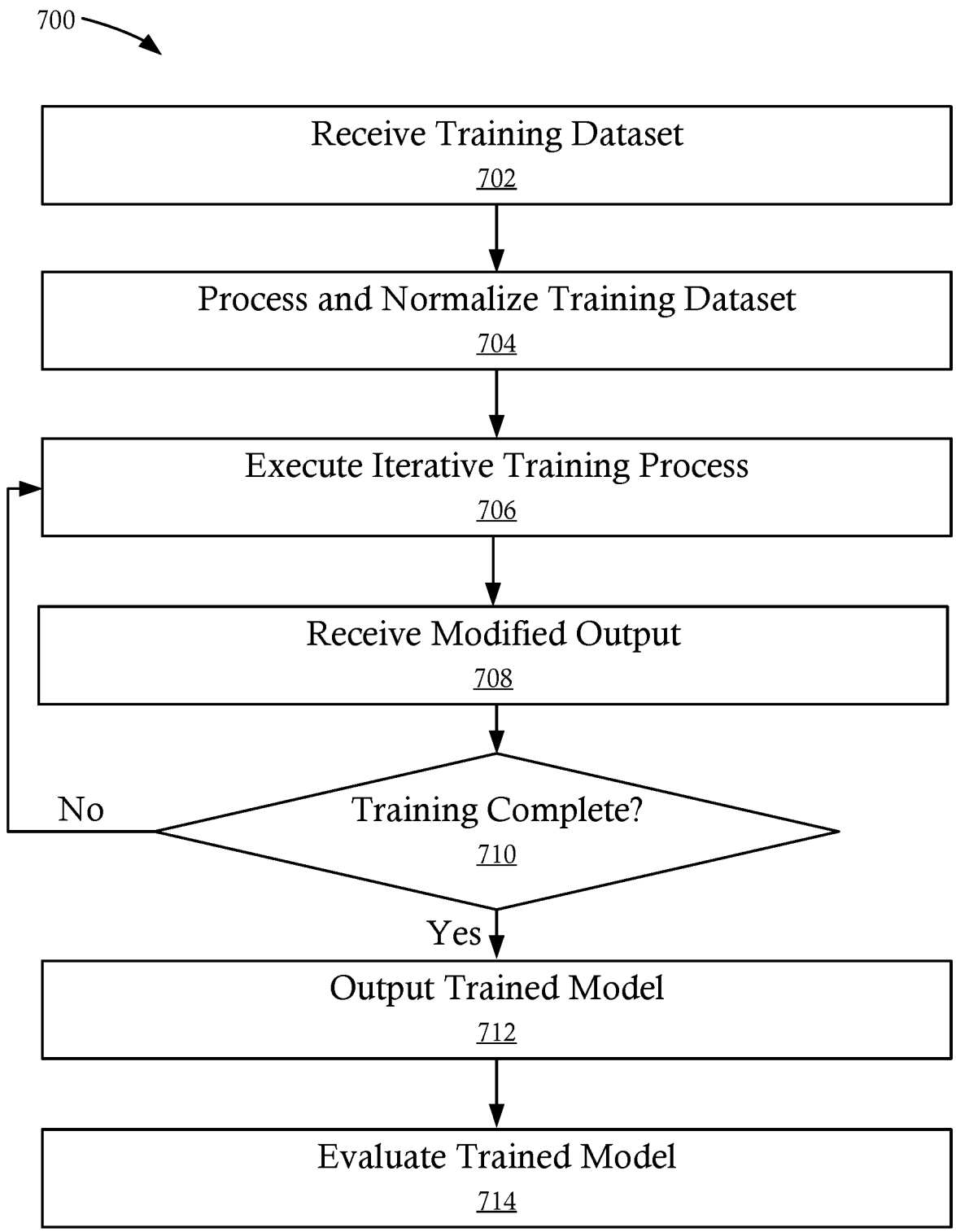
FIG. 21 is a flowchart illustrating a training method for iteratively training a machine learning model, in accordance with some embodiments.
Figure 22:
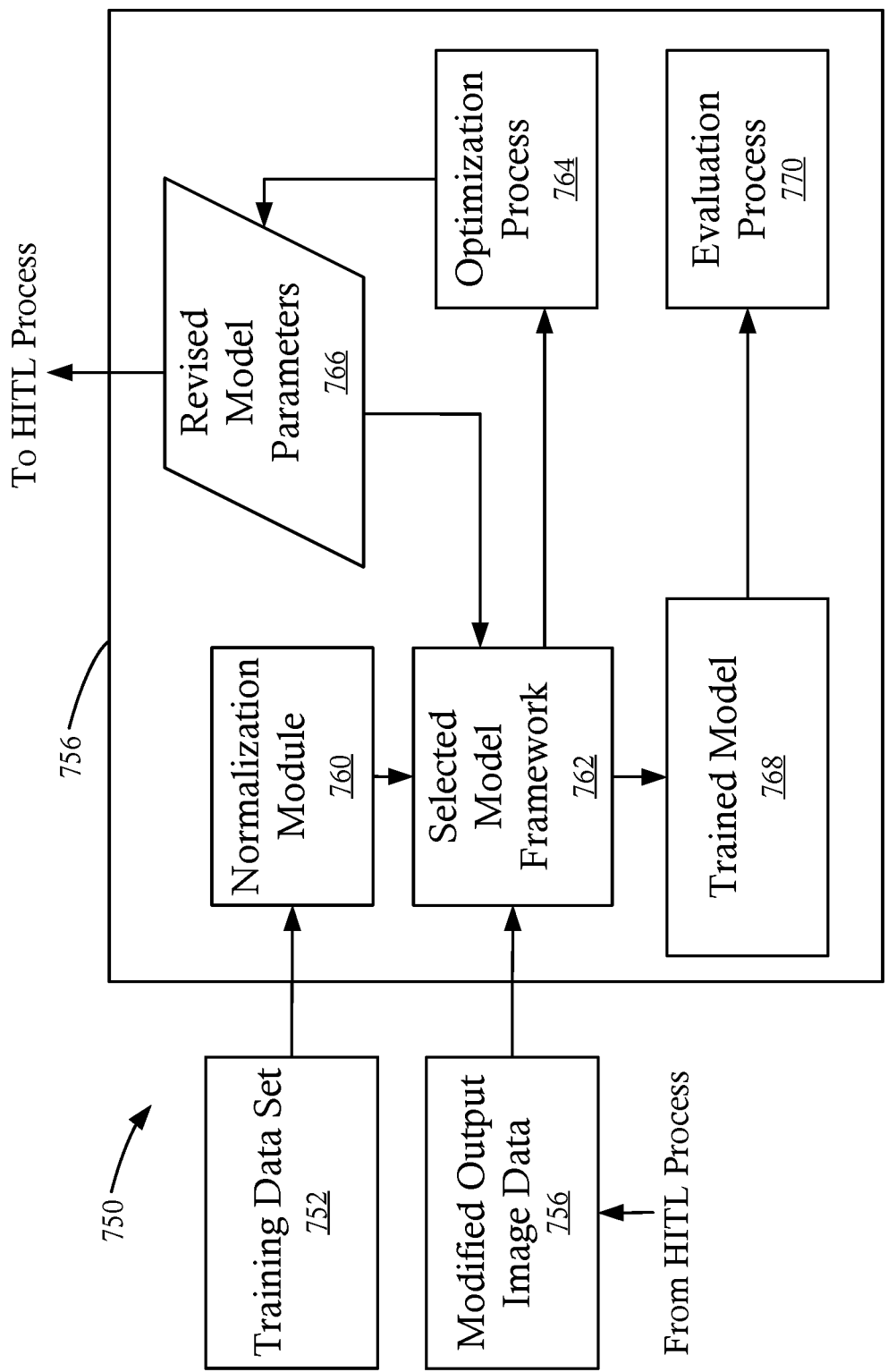
FIG. 22 is a process flow illustrating various steps of the training method of FIG. 21, in accordance with some embodiments.

As discussed above, in some embodiments, one or more of the disclosed engines and/or modules may be configured to implement and/or include one or more trained models, such as a logistical regression model, a combinatorial model, a relevance model, a ranking model, a clustering model, a graph model, an enrichment model, a pick item selection model, an embedding generation model, base item page model, etc. In some embodiments, one or more trained models can be generated using an iterative training process based on a training dataset. FIG. 21 illustrates a method 700 for generating a trained model, in accordance with some embodiments. FIG. 22 is a process flow 750 illustrating various steps of the method 700 of generating a trained model, in accordance with some embodiments. At step 702, a training dataset 752 is received by a system, such as an enrichment computing device 4, a processing device 10, a workstation 12, etc. The training dataset 752 can include labeled and/or unlabeled data, such as, for example, a set of labeled, semi-labeled, and/or unlabeled data.

As discussed above, in some embodiments, a training dataset 752 can include historical interaction data, such as historical query data and/or pseudo query data, as discussed above. As another example, in some embodiments, the training dataset 752 can include additional and/or alternative historical interaction data including, but not limited to, view data, click rate data, add-to-cart data, etc. In some embodiments, the training dataset 752 includes item feature data. The item feature data can include one or more item features extracted for an item and/or one or more variants of an item included in an item catalog. Item features can include, but are not limited to, brand, style, department, size, color, flavor, format, print, material, finish, quantity, etc.

In some embodiments, the training dataset 752 includes at least partially labeled training data. For example, in some embodiments, the training dataset 752 consists of a plurality of input datasets each including a query and one or items associated with historical interactions occurring after and/or in conjunction with the query, where the items represent a label (e.g., ground truth or target) for each of the queries. As another example, in some embodiments, the training dataset 752 includes item data identifying a plurality of items from an item catalog and a pseudo query generated for each of the items in the item data, where the item represents a label for each of the pseudo queries. It will be appreciated that any suitable labeled and/or partially labeled datasets can be provided for training of associated model frameworks, such as, for example, model frameworks suitable for generating a logistical regression model, a combinatorial model, a relevance model, a ranking model, an enrichment model, a pick item selection model, a base item page model, etc.

In some embodiments, the training dataset 752 includes unlabeled data. For example, in some embodiments, the training dataset 752 includes a set of inputs (e.g. text inputs, image inputs) configured to train an embedding framework. The set of inputs are provided without target embeddings (e.g., without labels). It will be appreciated that any suitable unlabeled datasets can be provided for training of associated model frameworks, such as, for example, model frameworks suitable for generating a graph model, a clustering model, an embedding generation model, etc. In some embodiments, the training dataset 752 includes identifiers for obtaining items, features, queries, and/or other training data from pre-existing sets stored in one or more storage locations. For example, in some embodiments, the training dataset 752 can include a set of reference identifiers for retrieving training data from a relevant database.

At optional step 704, the received training dataset 752 is processed and/or normalized by a normalization module 760. For example, in some embodiments, the training dataset 752 can be augmented by imputing or estimating missing values of one or more features associated with an item variant. In some embodiments, processing of the received training dataset 752 includes outlier detection configured to remove data likely to skew training of a variant-aware search engine and/or one or more sub-models. In some embodiments, processing of the received training dataset 752 includes removing features that have limited value with respect to training of the variant-aware search model (or related sub-models).

At step 706, an iterative training process is executed to train a selected model framework 762. The selected model framework 762 can include an untrained (e.g., base) machine learning model, such as a logistical regression framework, a combinatorial framework, a relevance framework, a search framework, etc. The training process is configured to iteratively adjust parameters (e.g., hyperparameters) of the selected model framework 762 to minimize a cost value (e.g., an output of a cost function) for the selected model framework 762.

The training process is an iterative process that generates set of revised model parameters 766 during each iteration. The set of revised model parameters 766 can be generated by applying an optimization process 764 to the cost function of the selected model framework 762. The optimization process 764 can be configured to reduce the cost value (e.g., reduce the output of the cost function) at each step by adjusting one or more parameters during each iteration of the training process.

After each iteration of the training process, at step 708, a determination is made whether the training process is complete. The determination at step 708 can be based on any suitable parameters. For example, in some embodiments, a training process can complete after a predetermined number of iterations. As another example, in some embodiments, a training process can complete when it is determined that the cost function of the selected model framework 762 has reached a minimum, such as a local minimum and/or a global minimum.

At step 710, a trained model 768 is output and provided for use in an interface generation method, such as the interface generation method 200, the query enrichment method 300, the feature determination method 400, etc. discussed above. At optional step 712, a trained model 768 can be evaluated by an evaluation process 770. A trained model can be evaluated based on any suitable metrics, such as, for example, an F or F1 score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained model.

Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
   a processor; and
   a non-transitory memory storing instructions that, when executed, cause the processor to:
   receive a request for an enhanced interface;
   generate one of an augmented query or a pseudo query based on the request for the enhanced interface, wherein the augmented query includes at least one added feature value;
   generate a set of candidate items responsive to the request for the enhanced interface, wherein the set of candidate items comprises a set of items responsive to the augmented query when the request for the enhanced interface includes a query and an anchor item and responsive to the pseudo query when the request for the enhanced interface includes the anchor item;
   generate a composite candidate score for each candidate item in the set of candidate items, wherein the composite candidate score is generated by a pick item scoring engine based on one or more historical interactions associated with each candidate item in the set of candidate items received by the pick item scoring module;
   select a set of top-k items from the set of candidate items, wherein the set of top-k items comprise k items from the set of candidate items having the highest candidate scores, and wherein k is a natural number;
   select at least one pick item from the set of top-k items;
   select at least one enhancement interface element for display in conjunction with the at least one pick item; and
   transmit a response to the request for the enhanced interface, wherein the response causes a receiving device to generate a user interface including the at least one pick item displayed in conjunction with the at least one enhancement interface element.

2. The system of claim 1, wherein generating the augmented query comprises:
generating a feature-specific query for a selected feature;
generating a set of n-grams from the feature-specific query;
generating a set of n-gram/value pairs each having a selected n-gram from the set of n-grams and a selected feature value from a set of feature values associated with the selected feature;
generating a similarity score for each n-gram/value pair in the set of n-gram/value pairs;
ranking the set of n-gram/value pairs by the similarity score for each n-gram/value pair; and
selecting a highest-ranked n-gram/value pair for generating the augmented query.

3. The system of claim 2, wherein generating the augmented query comprises substituting a value of the n-gram/value pair for an n-gram of the n-gram/value pair in the query to generate the augmented query.

4. The system of claim 1, wherein the composite candidate score comprises a combination of at least two of a logistical regression score generated by a logistical regression framework, an item global score generated by a combinatorial framework, and a relevance score generated by a relevance framework.

5. The system of claim 1, wherein selecting at least one pick item from the set of top-k items comprises:
generating the pseudo query when the request for the enhanced interface does not include the query;
clustering the augmented query or pseudo query associated with the request into one of a plurality of clusters by a clustering model, wherein the clustering model is generated based on a training dataset including historical search queries and generated pseudo queries;
comparing the set of top-k items to a cluster item associated with the one of the plurality of clusters; and
selecting the cluster item as the pick item.

6. The system of claim 5, wherein the pseudo query includes a first feature and a second feature associated with the anchor item.

7. The system of claim 1, wherein displaying the at least one pick item displayed in conjunction with the at least one enhancement interface element comprises overlaying the enhancement interface element over at least a portion of the at least one pick item.

8. The system of claim 1, wherein the enhancement interface element comprises a badge element, a contextual element, or a combination thereof.

9. A computer-implemented method, comprising:
receiving a request for an enhanced interface;
generating one of an augmented query or a pseudo query based on the request for the enhanced interface, wherein the augmented query includes at least one added feature value;
generating a set of candidate items responsive to the request for the enhanced interface, wherein the set of candidate items comprises a set of items responsive to the augmented query when the request for the enhanced interface includes a query and an anchor item and responsive to the pseudo query when the request for the enhanced interface includes the anchor item;
generating a composite candidate score for each candidate item in the set of candidate items, wherein the composite candidate score is generated by a pick item scoring engine based on one or more historical interactions associated with each candidate item in the set of candidate items received by the pick item scoring module;
selecting a set of top-k items from the set of candidate items, wherein the set of top-k items comprise k items from the set of candidate items having the highest candidate scores, and wherein k is a natural number;
selecting at least one pick item from the set of top-k items;
selecting at least one enhancement interface element for display in conjunction with the at least one pick item; and
transmitting a response to the request for the enhanced interface, wherein the response causes a receiving device to generate a user interface including the at least one pick item displayed in conjunction with the at least one enhancement interface element.

10. The computer-implemented method of claim 9, wherein generating the augmented query comprises:
generating a feature-specific query for a selected feature;
generating a set of n-grams from the feature-specific query;
generating a set of n-gram/value pairs each having a selected n-gram from the set of n-grams and a selected feature value from a set of feature values associated with the selected feature;
generating a similarity score for each n-gram/value pair in the set of n-gram/value pairs;
ranking the set of n-gram/value pairs by the similarity score for each n-gram/value pair; and
selecting a highest-ranked n-gram/value pair for generating the augmented query.

11. The computer-implemented method of claim 10, wherein generating the augmented query comprises substituting a value of the n-gram/value pair for an n-gram of the n-gram/value pair in the query to generate the augmented query.

12. The computer-implemented method of claim 9, wherein the composite candidate score comprises a combination of at least two of a logistical regression score generated by a logistical regression framework, an item global score generated by a combinatorial framework, and a relevance score generated by a relevance framework.

13. The computer-implemented method of claim 9, wherein selecting at least one pick item from the set of top-k items comprises:
generating the pseudo query when the request for the enhanced interface does not include the query;
clustering the augmented query or pseudo query associated with the request into one of a plurality of clusters by a clustering model, wherein the clustering model is generated based on a training dataset including historical search queries and generated pseudo queries;
comparing the set of top-k items to a cluster item associated with the one of the plurality of clusters; and
selecting the cluster item as the pick item.

14. The computer-implemented method of claim 13, wherein the pseudo query includes a first feature and a second feature associated with the anchor item.

15. The computer-implemented method of claim 9, wherein displaying the at least one pick item displayed in conjunction with the at least one enhancement interface element comprises overlaying the enhancement interface element over at least a portion of the at least one pick item.

16. The computer-implemented method of claim 9, wherein the enhancement interface element comprises a badge element, a contextual element, or a combination thereof.

17. A non-transitory computer-readable medium having instructions stored thereon, wherein the instructions, when executed by at least one processor, cause a device to perform operations comprising:

receiving a request for an enhanced interface;

generating one of an augmented query or a pseudo query based on the request for the enhanced interface, wherein the augmented query includes at least one added feature value;

generating a set of candidate items responsive to the augmented query or responsive to the pseudo query;

generating a composite candidate score for each candidate item in the set of candidate items, wherein the composite candidate score is generated by a pick item scoring engine based on one or more historical interactions associated with each candidate item in the set of candidate items received by the pick item scoring module;

selecting a set of top-k items from the set of candidate items, wherein the set of top-k items comprise k items from the set of candidate items having the highest candidate scores, and wherein k is a natural number;

selecting at least one pick item from the set of top-k items;

selecting at least one enhancement interface element for display in conjunction with the at least one pick item; and transmitting a response to the request for the enhanced interface, wherein the response causes a receiving device to generate a user interface including the at least one pick item displayed in conjunction with the at least one enhancement interface element.

18. The non-transitory computer-readable medium of claim 17, wherein generating the augmented query comprises:

generating a feature-specific query for a selected feature;

generating a set of n-grams from the feature-specific query;

generating a set of n-gram/value pairs each having a selected n-gram from the set of n-grams and a selected feature value from a set of feature values associated with the selected feature;

generating a similarity score for each n-gram/value pair in the set of n-gram/value pairs;

ranking the set of n-gram/value pairs by the similarity score for each n-gram/value pair; and selecting a highest-ranked n-gram/value pair for generating the augmented query.

* * * * *